United States Patent
Hiraki et al.

(10) Patent No.: US 11,426,986 B2
(45) Date of Patent: Aug. 30, 2022

(54) PACKAGING MATERIAL FOR BATTERIES, METHOD FOR PRODUCING SAME, POLYBUTYLENE TEREPHTHALATE FILM FOR PACKAGING MATERIAL FOR BATTERIES, AND BATTERY

(71) Applicant: DAI NIPPON PRINTING CO., LTD., Tokyo (JP)

(72) Inventors: Kenta Hiraki, Tokyo (JP); Atsuko Takahagi, Tokyo (JP); Rikiya Yamashita, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/496,546

(22) PCT Filed: Mar. 20, 2018

(86) PCT No.: PCT/JP2018/011020
§ 371 (c)(1),
(2) Date: Sep. 23, 2019

(87) PCT Pub. No.: WO2018/174056
PCT Pub. Date: Sep. 27, 2018

(65) Prior Publication Data
US 2020/0381679 A1 Dec. 3, 2020

(30) Foreign Application Priority Data
Mar. 21, 2017 (JP) .............................. JP2017-054096

(51) Int. Cl.
  B32B 27/32 (2006.01)
  B32B 27/08 (2006.01)
  (Continued)

(52) U.S. Cl.
  CPC .............. *B32B 27/32* (2013.01); *B32B 27/08* (2013.01); *B32B 27/36* (2013.01); *B32B 27/38* (2013.01);
  (Continued)

(58) Field of Classification Search
  CPC ......... B32B 27/32; B32B 27/08; B32B 27/36; B32B 27/38
  (Continued)

(56) References Cited

U.S. PATENT DOCUMENTS

2009/0269580 A1* 10/2009 Shiba ..................... B32B 27/16
  428/340
2014/0072864 A1* 3/2014 Suzuta .................... B32B 27/20
  429/176
(Continued)

FOREIGN PATENT DOCUMENTS

CN 104411751 A 3/2015
CN 105009322 A 10/2015
(Continued)

OTHER PUBLICATIONS

Dec. 15, 2020 Search Report issued in European Patent Application No. 18771595.8.
(Continued)

*Primary Examiner* — Betelhem Shewareged
(74) *Attorney, Agent, or Firm* — Oliff PLC

(57) ABSTRACT

A packaging material for batteries, which is not susceptible to warping, while having excellent formability. A packaging material for batteries is configured from a laminate that is sequentially provided at least with one or more substrate layers, a barrier layer, a cured resin layer and a thermally fusible resin layer in this order. At least one of the substrate layers is formed of a polybutylene terephthalate film; and the value (X/Y) which is obtained by dividing the puncture
(Continued)

strength X (N) of the laminate by the thickness Y (μm) of the polybutylene terephthalate film, the puncture strength X (N) being determined by piercing the laminate from the substrate layer side by a method that complies with the prescription of JIS Z1707 (1997), is 1.02 N/μm or more.

26 Claims, 3 Drawing Sheets

(51) Int. Cl.
  *B32B 27/36* (2006.01)
  *B32B 27/38* (2006.01)
(52) U.S. Cl.
  CPC ....... *B32B 2250/04* (2013.01); *B32B 2250/24* (2013.01)
(58) Field of Classification Search
  USPC ........................................................ 428/213
  See application file for complete search history.

(56) References Cited

U.S. PATENT DOCUMENTS

| | | |
|---|---|---|
| 2015/0183204 A1 | 7/2015 | Nanjo et al. |
| 2015/0299406 A1* | 10/2015 | Gotou .................. C08J 5/18 525/444 |
| 2015/0380692 A1 | 12/2015 | Ojiri et al. |
| 2018/0076423 A1 | 3/2018 | Kokuryo et al. |
| 2019/0157633 A1 | 5/2019 | Ojiri et al. |
| 2020/0381679 A1* | 12/2020 | Hiraki .................... B32B 27/32 |

FOREIGN PATENT DOCUMENTS

| | | |
|---|---|---|
| EP | 1 102 336 A1 | 5/2001 |
| EP | 2 955 770 A1 | 12/2015 |
| EP | 3 121 864 A1 | 1/2017 |
| JP | 2011-204674 A | 10/2011 |
| JP | 2013-214458 A | 10/2013 |
| JP | 2015-147309 A | 8/2015 |
| JP | 2016-195113 A | 11/2016 |
| JP | 2017-027702 A | 2/2017 |
| WO | 2015/072451 A1 | 5/2015 |
| WO | 2016/158797 A1 | 10/2016 |

OTHER PUBLICATIONS

Jun. 26, 2018 International Search Report issued in International Patent Application No. PCT/JP2018/011020.

Oct. 22, 2021 Office Action issued in Chinese Patent Application No. 201880020240.4.

Nov. 9, 2021 Office Action issued in Japanese Patent Application No. 2019-507689.

* cited by examiner

PACKAGING MATERIAL FOR BATTERIES, METHOD FOR PRODUCING SAME, POLYBUTYLENE TEREPHTHALATE FILM FOR PACKAGING MATERIAL FOR BATTERIES, AND BATTERY

TECHNICAL FIELD

The present invention relates to a battery packaging material, a method for producing the same, a polybutylene terephthalate film for a battery packaging material, and a battery.

BACKGROUND ART

Various types of batteries have heretofore been developed, and in every battery, a packaging material is an essential member for encapsulating battery elements such as an electrode and an electrolyte. Metallic packaging materials have heretofore been used widely as battery packaging materials.

In recent years, with the advancement in performance of electric vehicles, hybrid electric vehicles, personal computers, cameras, mobile phones, etc., various shapes have been required for batteries, and reduction in thickness or weight have also been required. However, metallic battery packaging materials that have heretofore often been used are disadvantageous in that they have difficulty in keeping up with diversification in shape and are limited in weight reduction.

Thus, a film-shaped laminate in which a base material/an aluminum alloy foil layer/a heat-sealable resin layer are laminated in this order has recently been proposed as a battery packaging material that can be readily processed into various shapes and can achieve a thickness reduction and a weight reduction.

In such a battery packaging material, generally, a concave portion is formed by cold molding, a battery element such as an electrode and an electrolytic solution are disposed in a space formed by the concave portion, and portions of the heat-sealable resin layer are heat-welded to each other to give a battery with the battery element contained in the battery packaging material. Such a film-shaped packaging material, however, is thinner than a metallic packaging material and has a disadvantage of easily generating pinholes and cracks during molding. In a battery packaging material where pinholes and cracks have been generated, an electrolytic solution may permeate as far as the aluminum alloy foil layer to form a metal precipitate, possibly resulting in generation of a short-circuit. Therefore, it is essential for the film-shaped battery packaging material to have a property of being unlikely to generate pinholes during molding, i.e. excellent moldability.

In film-shaped battery packaging materials, a polyamide film and a polyester film are commonly used as the base material layers thereof. For example, polybutylene terephthalate is superior in crystallinity, dimensional stability, thermal stability, and chemical resistance, but it has a problem that it is prone to warp as compared to polyethylene terephthalate.

On the other hand, for example, Patent Document 1 describes that by laminating 50 or more layers of a layer being a biaxially oriented polyester film mainly containing polybutylene terephthalate resin and formed by using polyester A and a layer formed by using polyester B in the thickness direction, a laminate being superior in moldability, warp resistance and acid resistance and being free of delaminate at the time of molding is obtained.

PRIOR ART DOCUMENTS

Patent Documents

Patent Document 1: Japanese Patent Laid-open Publication No. 2015-147309

SUMMARY OF THE INVENTION

Problems to be Solved by the Invention

Even if the moldability and the warp resistance of a laminate including a polybutylene terephthalate film are improved by the technology of Patent Document 1, the attempt to form a base material layer of a battery packaging material by laminating no less than 50 layers of two types of polyester films requires a very complicated apparatus and results in low productivity, so that it is difficult to apply this technology to battery packaging materials.

Under such circumstances, a main object of the present invention is to provide a technology for achieving both superior moldability and suppression of warp in a battery packaging material including a polybutylene terephthalate film as a base material layer. It is another object of the present invention to provide a battery including the battery packaging material and a method for producing the battery packaging material.

Means for Solving the Problem

The present inventors diligently studied to solve the above-described problems. As a result, they found that a battery packaging material constituted of a laminate including a base material layer, a barrier layer, a cured resin layer, and a heat-sealable resin layer in this order, wherein at least one layer of the base material layer is formed of a polybutylene terephthalate film, and a value (X/Y) determined by dividing a piercing strength X (N) in the case of piercing the laminate from the base material layer side measured by a method in accordance with a provision of JIS Z1707:1997 by a thickness Y (μm) of the polybutylene terephthalate film is 1.02 N/μm or more has superior moldability and is less likely to warp. The present invention has been completed by repetitively conducting further studies on the basis of these findings.

In summary, the present invention provides aspects of invention as itemized below:

Item 1.

A battery packaging material constituted of a laminate including a base material layer, a barrier layer, a cured resin layer, and a heat-sealable resin layer in this order, wherein at least one layer of the base material layer is formed of a polybutylene terephthalate film, and a value determined by dividing a piercing strength X (N) in the case of piercing the laminate from the base material layer side measured by a method in accordance with a provision of JIS Z1707:1997 by a thickness Y (μm) of the polybutylene terephthalate film is 1.02 N/μm or more.

Item 2.

The battery packaging material according to Item 1, wherein a resin constituting the cured resin layer is a cured product of a resin composition containing an acid-modified polyolefin.

Item 3.

The battery packaging material according to Item 1 or 2, wherein the resin constituting the cured resin layer has a polyolefin skeleton.

Item 4.

The battery packaging material according to any one of Items 1 to 3, wherein when the cured resin layer is analyzed by infrared spectroscopy, a peak derived from maleic anhydride is detected.

Item 5.

The battery packaging material according to any one of Items 1 to 4, wherein the resin constituting the cured resin layer is a cured product of a resin composition containing at least one species selected from the group consisting of a compound having an isocyanate group, a compound having an oxazoline group, and a compound having an epoxy group.

Item 6.

The battery packaging material according to any one of Items 1 to 4, wherein the resin constituting the cured resin layer is a cured product of a resin composition containing a curing agent having at least one member selected from the group consisting of an oxygen atom, a heterocyclic ring, a C=N bond, and a C—O—C bond.

Item 7.

The battery packaging material according to any one of Items 1 to 4, wherein the resin constituting the cured resin layer is a cured product of a resin composition containing at least one species selected from the group consisting of a urethane resin, an ester resin, and an epoxy resin.

Item 8.

The battery packaging material according to any one of Items 1 to 7, wherein a total thickness of the cured resin layer and the heat-sealable resin layer is 90 μm or less.

Item 9.

The battery packaging material according to any one of Items 1 to 8, wherein the thickness Y of the polybutylene terephthalate film is 10 μm or more and 40 μm or less.

Item 10.

The battery packaging material according to any one of Items 1 to 9, wherein the thickness of the cured resin layer is 0.5 μm or more and 40 μm or less.

Item 11.

A method for producing a battery packaging material, the method including a step of obtaining a laminate by laminating at least a base material layer, a barrier layer, a cured resin layer and a heat-sealable resin layer in this order, wherein at least one layer of the base material layer is formed of a polybutylene terephthalate film, and a value determined by dividing a piercing strength X (N) in the case of piercing the laminate from its base material layer side measured by a method in accordance with a provision of JIS Z1707:1997 by a thickness Y (μm) of the polybutylene terephthalate film is 1.02 N/μm or more.

Item 12.

A method including a step of obtaining a laminate by laminating at least a base material layer, a barrier layer, a cured resin layer and a heat-sealable resin layer in this order, wherein at least one layer of the base material layer is formed of a polybutylene terephthalate film, and in the step of obtaining the laminate and a following step thereof, a sum total of a product of a temperature T (° C.) and a time S (minutes) when the polybutylene terephthalate film is exposed to 100° C. or more is set to 160 or less.

Item 13.

A battery in which a battery element containing at least a positive electrode, a negative electrode, and an electrolyte is contained in a packaging formed of a battery packaging material according to any one of Items 1 to 10.

Item 14.

A polybutylene terephthalate film for a battery packaging material is a polybutylene terephthalate film to be used for a battery packaging material constituted of a laminate including at least a base material layer, a barrier layer, a cured resin layer, and a heat-sealable resin layer in this layer as the base material layer, wherein in the battery packaging material, a value determined by dividing a piercing strength X (N) in the case of piercing the laminate from its base material layer side measured by a method in accordance with a provision of JIS Z1707:1997 by a thickness Y (μm) of the polybutylene terephthalate film is 1.02 N/μm or more.

Advantages of the Invention

According to the present invention, it is possible to provide a battery packaging material constituted of a laminate including a base material layer, a barrier layer, a cured resin layer, and a heat-sealable resin layer in this order, having superior moldability and being less likely to warp due to the fact that at least one layer of the base material layer is formed of a polybutylene terephthalate film and a value (X/Y) determined by dividing a piercing strength X (N) in the case of piercing the laminate from its base material layer side measured by a method in accordance with a provision of JIS Z1707:1997 by a thickness Y (μm) of the polybutylene terephthalate film is 1.02 N/μm or more. In addition, according to the present invention, it is also possible to provide a battery including the battery packaging material and a method for producing the battery packaging material.

EMBODIMENTS OF THE INVENTION

The battery packaging material of the present invention is characterized by being a battery packaging material constituted of a laminate including a base material layer, a barrier layer, a cured resin layer, and a heat-sealable resin layer in this order, wherein at least one layer of the base material layer is formed of a polybutylene terephthalate film, and a value (X/Y) determined by dividing a piercing strength X (N) in the case of piercing the laminate from the base material layer side measured by a method in accordance with a provision of JIS Z1707:1997 by a thickness Y (μm)

of the polybutylene terephthalate film is 1.02 N/μm or more. The battery packaging material of the present invention is characterized by having superior moldability and being less likely to warp due to its possession of such configuration. Hereinafter, the battery packaging material of the present invention will be described in detail.

In the present description, any numerical range indicated by " . . . to . . . " is intended to mean " . . . or more" and " . . . or less". For example, the recitation "2 to 15 mm" is intended to mean "2 mm or more and 15 mm or less."

1. Laminated Structure and Physical Properties of Battery Packaging Material

Figure 1:
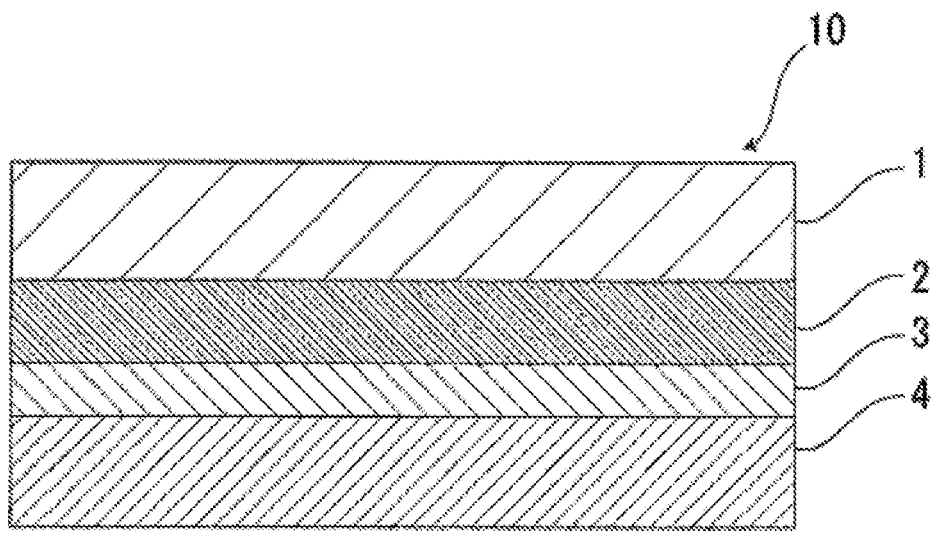
FIG. 1 is a diagram illustrating one example of a cross-sectional structure of a battery packaging material of the present invention.

The battery packaging material 10 of the present invention is made of, for example, a laminate including a base material layer 1, a barrier layer 2, a cured resin layer 3 and a heat-sealable resin layer 4 in this order as shown in FIG. 1. In the battery packaging material of the present invention, the base material layer 1 is disposed on an outermost layer side, and the heat-sealable resin layer 4 is an innermost layer. That is, portions of the heat-sealable resin layer 4 that are situated on a periphery of a battery element are heat-sealed to each other to hermetically seal the battery element in the heat-sealable resin layer during assembly of a battery, so that the battery element is encapsulated.

Figure 2:
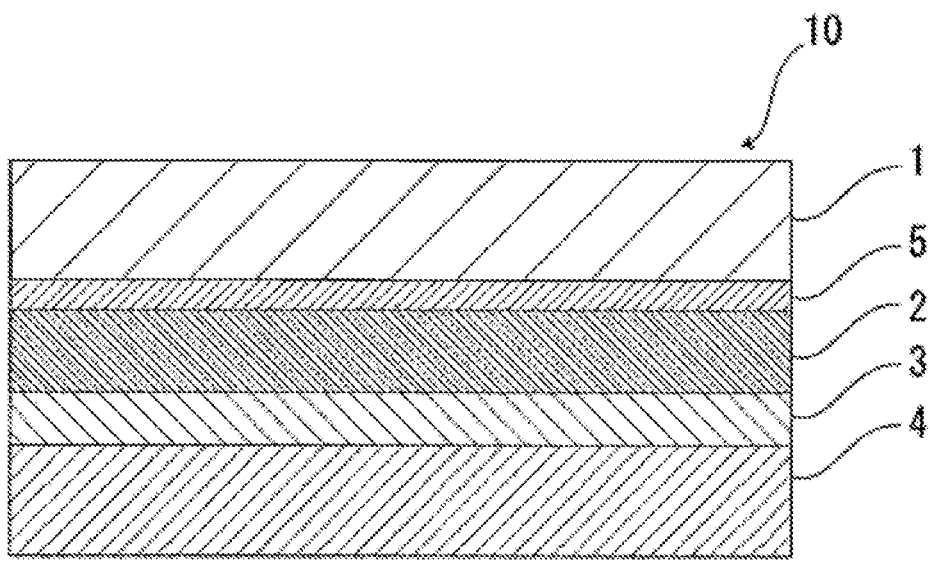
FIG. 2 is a diagram illustrating one example of a cross-sectional structure of a battery packaging material of the present invention.
Figure 3:
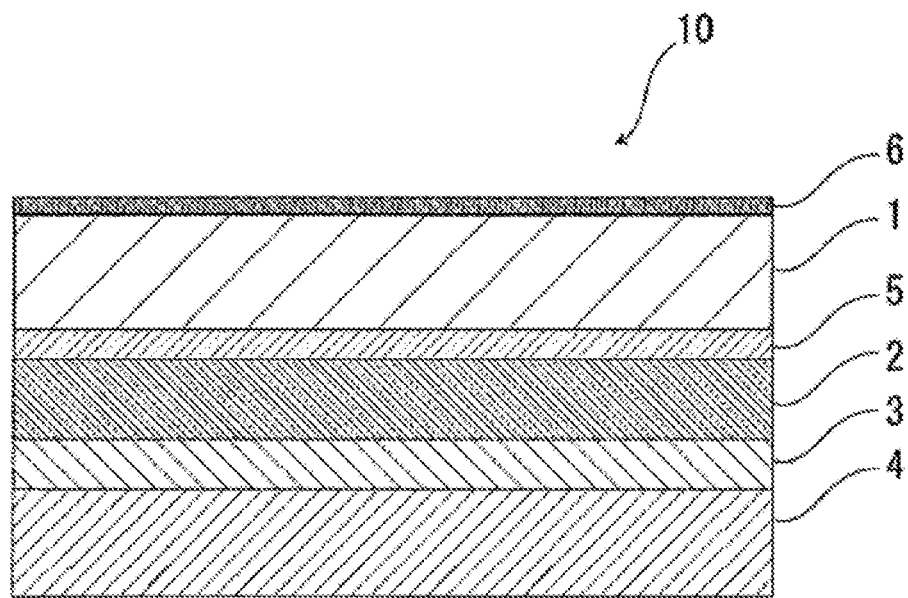
FIG. 3 is a diagram illustrating one example of a cross-sectional structure of a battery packaging material of the present invention.

As shown in FIG. 2, the battery packaging material of the present invention may optionally include an adhesive agent layer 5 between the base material layer 1 and the barrier layer 2 in order to improve the bondability between these layers. Further, as shown in FIG. 3, a surface coating layer 6 or the like may be provided on an exterior of the base material layer 1 (opposite to the heat-sealable resin layer 4) as necessary.

In the battery packaging material of the present invention, at least one layer of the base material layer 1 is formed of a polybutylene terephthalate film. In addition, the value (X/Y) determined by dividing a piercing strength X (N) in the case of piercing the laminate from its base material layer side measured by a method in accordance with a provision of JIS Z1707:1997 by a thickness Y (μm) of the polybutylene terephthalate film is 1.02 N/μm or more. The thickness Y (μm) of the polybutylene terephthalate film is a value measured using a laser microscope for a cross section in the thickness direction of the battery packaging material.

Piercing strength (puncture strength) is measured according to JIS Z1707:1997. In this standardized test, a test piece is fixed and a semicircular needle of 1.0 mm in diameter and 0.5 mm in tip form radius punctures at a speed of 50±5 mm per minute to measure the maximum stress by the time when the needle penetrates. As described above, the piercing strength X is obtained by piercing the laminate from its base material layer side. The piercing strength is determined as an average measured strength of at least five testing pieces.

The battery packaging material of the present invention is superior in moldability due to the condition that at least one layer of the base material layer 1 is formed of a polybutylene terephthalate film and the above-mentioned ratio X/Y is 1.02 N/μm or more. The details of this mechanism are not necessarily clear, but can be considered as follows. That is, since the ratio (X/Y) of the piercing strength X (N) in the case of piercing the laminate from its base material layer 1 side to the thickness Y (μm) of the polybutylene terephthalate film is as large as 1.02 N/μm or more, it can be said that a large internal stress exists in the laminate. Furthermore, polybutylene terephthalate films are higher in flexibility as compared to polyethylene terephthalate and the like. It is believed that the laminate is gradually stretched due to combination of these factors while resisting the force applied during cold molding. Therefore, since the barrier layer 2 is also gradually stretched, it is considered that the occurrence of pinholes or cracks is effectively suppressed.

From the viewpoint of further improving the moldability of the battery packaging material, as to the value (X/Y) determined by dividing a piercing strength X (N) in the case of piercing the laminate from its base material layer 1 side by a thickness Y (μm) of the polybutylene terephthalate film, the lower limit thereof is preferably about 1.03 N/μm or more, more preferably about 1.06 N/μm or more, and even more preferably 1.13 N/μm or more, and the upper limit thereof is preferably about 1.30 N/μm or less, more preferably about 1.20 N/μm or less. Further, as preferable examples of the range of X/Y, about 1.03 to 1.30 N/μm, about 1.03 to 1.20 N/μm, about 1.06 to 1.30 N/μm, about 1.06 to 1.20 N/μm, about 1.13 to 1.30 N/μm, and about 1.13 to 1.20 N/μm are preferable particularly in order to achieve both of the improvement of moldability and the suppression of warp in a more balanced manner. The piercing strength X (N) may satisfy the above-mentioned X/Y in relation to the thickness Y of the polybutylene terephthalate film, but from the viewpoint of further enhancing the moldability of the battery packaging material, it is preferably about 15 to 35 N, and more preferably about 15 to 30 N.

The thickness of the laminate constituting the battery packaging material of the present invention is not particularly limited, but from the viewpoint of enhancing the moldability of the battery packaging material and concurrently effectively suppressing the warp thereof while reducing the thickness of the battery packaging material, the upper limit is preferably about 250 μm or less, more preferably about 200 μm or less, even more preferably about 160 μm or less, still even more preferably about 120 μm or less, and the lower limit is preferably about 35 μm or more, more preferably 45 μm or more, and even more preferably 81 μm or more. The range of the thickness is preferably about 35 to 250 μm, about 45 to 250 μm, about 81 to 250 μm, about 35 to 200 μm, about 45 to 200 μm, about 81 to 200 μm, about 35 to 160 μm, about 45 to 160 μm, about 81 to 160 μm, about 35 to 120 μm, about 45 to 120 μm, or about 81 to 120 μm. Even when the thickness of the laminate constituting the battery packaging material of the present invention is, for example, about 250 μm or less, it is possible according to the present invention to enhance the moldability of the battery packaging material and concurrently effectively suppress the warp thereof. The battery packaging material of the present invention can contribute to the improvement of the energy density of a battery through reduction in the thickness of the material.

Furthermore, in the battery packaging material of the present invention, the cured resin layer 3 is provided between the barrier layer 2 and the heat-sealable resin layer 4. Thanks to this, the battery packaging material of the present invention is effectively inhibited from warping even though at least one layer of the base material layer 1 is formed of a polybutylene terephthalate film and the above-mentioned ratio X/Y is 1.02 N/μm or more.

Specifically, as the result of the present inventors' studies, it is possible to favorably enhance the moldability of a battery packaging material when the value (X/Y) determined by dividing a piercing strength X (N) in the case of piercing the laminate from its base material layer side by a thickness Y (μm) of the polybutylene terephthalate film is 1.02 N/μm or more as described above. It, however, has become clear that the battery packaging material thus improved in moldability is likely to warp. If a battery packaging material is likely to warp, there is a problem that when the battery packaging material is produced in an elongated strip shape and is rolled up, it becomes difficult to handle and when the battery packaging material is subjected to molding, it becomes difficult to adjust the alignment to a mold, so that the molding accuracy is likely to decrease. On the other hand, the battery packaging material of the present invention is effectively inhibited from warping while keeping its high moldability as described above thanks to the configuration that the cured resin layer 3, which is a cured product of a resin composition, is provided between the barrier layer 2 and the heat-sealable resin layer 4. The details of the cured resin layer 3 are as described later.

2. Layers that Form Battery Packaging Material

[Base Material Layer 1]

In the battery packaging material of the present invention, the base material layer 1 is a layer situated on the outermost layer side. In the present invention, at least one layer of the base material layer 1 is formed of a polybutylene terephthalate film.

The method for making the value (X/Y) determined by dividing a piercing strength X (N) in the case of piercing the laminate constituting the battery packaging material of the present invention from its base material layer side by a thickness Y (μm) of the polybutylene terephthalate film to be 1.02 N/μm or more is not limited, and one example thereof may be a method of causing a polybutylene terephthalate film to have a large internal stress. One example may be use of a polybutylene terephthalate film having a large heat shrinkage ratio. For example, the polybutylene terephthalate film to be used for the base material layer 1 preferably has both a heat shrinkage ratio at 150° C. in one direction of the polybutylene terephthalate film (a plane direction of the film) and a heat shrinkage ratio at 150° C. in the other direction (a plane direction of the film) orthogonal to the one direction being 3.0% or more in the atmosphere. Use of a polybutylene terephthalate film having a heat shrinkage ratio of 3.0% or more in such two directions, which are larger than that of conventional polybutylene terephthalate films, makes it possible to more effectively improve the moldability of a battery packaging material. The details of this mechanism are not necessarily clear, but they can be considered as follows. That is, since the heat shrinkage ratio in two directions is as large as 3.0% or more, it can be said that the polybutylene terephthalate film has a large internal stress. Furthermore, polybutylene terephthalate films are higher in flexibility as compared to polyethylene terephthalate and the like. Thus, like the above-described mechanism, it is believed that the laminate is gradually stretched while resisting the force applied during cold molding. Therefore, since the barrier layer 2 is also gradually stretched, it is considered that the occurrence of pinholes or cracks is more effectively suppressed. In addition, although the one direction in which a heat shrinkage ratio is measured and the other direction orthogonal to this are not particularly limited, respectively, a direction with the largest heat shrinkage ratio may be designated as the one direction.

In the present invention, when using a polybutylene terephthalate film which has both a heat shrinkage ratio at 150° C. in one direction (a plane direction of the film) and a heat shrinkage ratio at 150° C. in the other direction (a plane direction of the film) orthogonal to the one direction being 3.0% or more, excellent moldability can be provided to a battery packaging material. For example, in the case where the base material layer is formed of a single layer of a polyethylene terephthalate film that is commonly used as a base material layer of a battery packaging material, there is a problem that pinholes are easily formed when molding depth is increased. Moreover, when the base material layer is constituted by a single layer of a nylon film, which is likewise commonly used, there is a problem that chemical resistance and insulation quality are low. In contrast, thanks to the use of the polybutylene terephthalate film described above, the moldability is superior as compared with polyethylene terephthalate films and the chemical resistance and the insulation quality are superior to nylon films. The chemical resistance of a battery packaging material can be evaluated, for example, by the method described in Examples. The size of a specimen to be evaluated may be smaller than the size of 40 mm×40 mm adopted in Examples.

In the polybutylene terephthalate film, the ratio of the heat shrinkage ratio in the one direction and the heat shrinkage ratio in the other direction (the ratio determined by dividing the larger value by the smaller value of the heat shrinkage ratio in the one direction and the heat shrinkage ratio in the another direction) is preferably 0.6 to 1.0, and more preferably 1.0. Since the magnitudes of heat shrinkage ratios in two directions are well balanced due to the condition that the ratio of the heat shrinkage ratios falls within such a range, the moldability of the packaging material can be more effectively enhanced.

From the viewpoint of further improving the moldability of the battery packaging material, the heat shrinkage ratio of the polybutylene terephthalate film is 3.0 to 15.0%, and more preferably 4.0 to 12.0%. Although the heat shrinkage ratio should just be in the aforementioned range in any one of the above-mentioned one direction and the other direction, it is preferable that the heat shrinkage ratio is in the range in both the directions.

Figure 4:
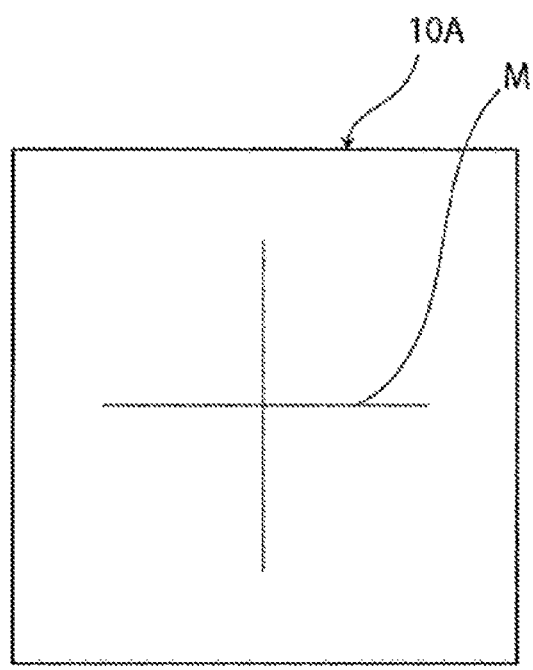
FIG. 4 is a schematic diagram for explaining a method for measuring a heat shrinkage ratio of a polybutylene terephthalate film.

In the present invention, the heat shrinkage ratio of a polybutylene terephthalate film is a value measured by the following method. First, as shown in the schematic view of FIG. 4, a polybutylene terephthalate film with a 120 mm×120 mm square shape in plan view is used as a specimen 10A. On a surface of the specimen 10A, two ca. 100 mm-long straight lines M are drawn with a pen so as to be orthogonal to each other. At this time, the intersection of the two straight lines is positioned at the center of the polybutylene terephthalate film. Also, the two straight lines are drawn as being parallel to the edges of the specimen. Next, the precise lengths of the two lines are measured using a glass scale (the values measured at this time are expressed by A). Next, the specimen 10A is put in an oven at 150° C. (in the air), left at rest for 30 minutes, and then taken out to a room temperature environment (25° C.). The specimen 10A taken out is left at rest in a room temperature environment (25° C.) for 30 minutes or more under the same standard condition as before the test. Next, the precise lengths of the two lines are measured using a glass scale (the values measured at this time are expressed by B). Heat shrinkage ratios in the two directions are calculated by the calculation formula: (A−B)/A×100. When the size of the specimen is smaller than 120 mm×120 mm, two straight lines shorter than the edges of the specimen are drawn, and heat shrinkage ratios can be measured by the same way.

The heat shrinkage ratio of the polybutylene terephthalate film of the present invention can be adjusted by various methods and it can be adjusted, for example, by the type of a film forming method and conditions at the time of film formation (for example, film forming temperature, stretching ratio, cooling temperature, cooling speed, and heat setting temperature after stretching). Examples of a method for forming a polybutylene terephthalate film include a T-die method, a calendar method, and a tubular method. Among these, the tubular method is preferable from the viewpoint of enhancing the heat shrinkage ratio of the polybutylene terephthalate film.

Although the thickness Y of the polybutylene terephthalate film is not particularly limited as long as the above-mentioned range of X/Y is satisfied, from the viewpoint of enhancing the moldability of the battery packaging material, the upper limit is preferably about 40 µm or less, more preferably about 35 µm or less, even more preferably about 30 µm or less, and particularly preferably about 25 µm or less, and the lower limit is preferably about 10 µm or more, more preferably about 12 µm or more, and even more preferably about 15 µm or more. The range of the thickness Y may preferably be about 10 to 40 µm, about 10 to 35 µm, about 10 to 30 µm, about 10 to 25 µm, about 12 to 40 µm, about 12 to 35 µm, about 12 to 30 µm, or 12 to 25 µm, about 15 to 40 µm, about 15 to 35 µm, about 15 to 30 µm, or about 15 to 25 µm. As described later, when the base material layer 1 includes multiple polybutylene terephthalate films, the thickness Y of the polybutylene terephthalate film is the sum total of the thicknesses of all the polybutylene terephthalate films. It is noted that the thickness of the adhesive agent layer provided between the individual films is not included in the thickness Y.

The base material layer 1 may be a single layer or may be constituted of multiple layers. When the base material layer 1 is a single layer, the base material layer 1 is constituted of a polybutylene terephthalate film. When the base material layer 1 is constituted of multiple layers, the base material layer 1 has at least one layer constituted of a polybutylene terephthalate film and further has other layers. The polybutylene terephthalate film is constituted of polybutylene terephthalate, copolyester with butylene terephthalate as a main repeating unit, or the like. Specific examples of the copolyester with butylene terephthalate as a main repeating unit include copolymerized polyester obtained by polymerizing butylene terephthalate as a main repeating unit with butylene isophthalate (briefly expressed as polybutylene (terephthalate/isophthalate) and the same applies hereinafter), polybutylene (terephthalate/adipate), polybutylene (terephthalate/sebacate), and polybutylene (terephthalate/decane dicarboxylate). The polybutylene terephthalate film may contain polyethylene terephthalate, a polyester-based elastomer, etc.

The other layers may be constituted of the above-described polybutylene terephthalate film or may be constituted of other materials. The other materials are not particularly limited as long as they have insulation quality, and examples thereof include polyesters (excluding polybutylene terephthalate), polyamides, epoxy resins, acrylic resins, fluororesins, polyurethanes, silicone resins, phenol resins, polycarbonate resins, polyetherimides, polyimides, and mixtures and copolymers thereof.

Examples of the polyesters include polyethylene terephthalate, polyethylene naphthalate, polybutylene naphthalate, polyethylene isophthalate, and copolyesters with ethylene terephthalate as a main repeating unit. Examples of the copolyester with ethylene terephthalate as a main repeating unit include copolymer polyester obtained by polymerizing ethylene terephthalate as a main repeating unit with ethylene isophthalate (briefly expressed as polyethylene (terephthalate/isophthalate) and the same applies hereinafter), polyethylene (terephthalate/isophthalate), polyethylene (terephthalate/adipate), polyethylene (terephthalate/sodium sulfoisophthalate), polyethylene (terephthalate/sodium isophthalate), polyethylene (terephthalate/phenyl-dicarboxylate), and polyethylene (terephthalate/decane dicarboxylate). Examples of other copolyesters with butylene terephthalate as a main repeating unit include polybutylene naphthalate. These polyesters may be used singly or in combinations of two or more thereof. Polyester has an advantage of being superior in electrolytic solution resistance and is less likely to generate whitening or the like caused by adhesion of an electrolytic solution, and it is suitably used as the material for forming the base material layer 1.

Specific examples of polyamides include aliphatic polyamides such as nylon 6, nylon 66, nylon 610, nylon 12, nylon 46, and copolymers of nylon 6 and nylon 66; polyamides containing aromatics such as hexamethylenediamine-isophthalic acid-terephthalic acid copolyamides containing a structural unit derived from terephthalic acid and/or isophthalic acid, such as nylon 6I, nylon 6T, nylon 6IT, and nylon 6I6T (I denotes isophthalic acid, and T denotes terephthalic acid), and polymethaxylylene adipamide (MXD6); cycloaliphatic polyamides such as polyaminomethyl cyclohexyl adipamide (PACM 6); polyamides copolymerized with a lactam component or an isocyanate component such as 4,4'-diphenylmethane-diisocyanate, and polyester amide copolymers or polyether ester amide copolymers that are copolymers of copolyamides and polyesters or polyalkylene ether glycol; and copolymers thereof. These polyamides may be used singly or two or more thereof may be used in combination. Stretched polyamide films are superior in stretchability and can prevent the occurrence of whitening due to resin breakage in the base material layer 1 during molding, so that they are suitably used as the material for forming the base material layer 1.

Specific examples of the case where the base material layer 1 is formed of multiple layers include a multilayer structure in which a polybutylene terephthalate film and another polybutylene terephthalate film are laminated, a multilayer structure in which a polybutylene terephthalate film and a nylon film are laminated, and a multilayer structure in which a polybutylene terephthalate film and a polyester film (excluding any polybutylene terephthalate film) are laminated. For example, when the base material layer 1 is formed of two resin films, preferred are a configuration in which a polybutylene terephthalate film and another polybutylene terephthalate film are laminated, a configuration in which a polybutylene terephthalate film and a nylon film are laminated, and a configuration in which a polybutylene terephthalate film and a polyethylene terephthalate film are laminated. In addition, a polybutylene terephthalate film is less likely to discolor when, for example, an electrolytic solution adheres to the surface thereof. Therefore, when the base material layer 1 has a multilayer structure including a nylon film, the base material layer 1 preferably forms a laminate having the nylon film and the polybutylene terephthalate film in this order when viewed from the barrier layer 2 side.

When the base material layer 1 is formed to have a multilayer structure, resin films may be bonded via an adhesive agent, or alternatively may be directly laminated without an adhesive agent. Examples of a method for bonding resin films without an adhesive agent include methods of bonding resin films in a heat-melted state, such as a coextrusion method, a sandwich lamination method, and a thermal lamination method. When the films are bonded with an adhesive agent interposed therebetween, the adhesive agent to be used may be either a two-liquid curable adhesive agent or a one-liquid curable adhesive agent. Furthermore, the adhesive mechanism of the adhesive agent is not particularly limited and may be any one of a chemical reaction type, a solvent volatilization type, a heat melting type, a heat pressing type, an electron beam curing type, an ultraviolet curing type, and the like. Examples of the adhesive agent include those the same as the adhesive agents provided as examples for the adhesive agent layer 5 described later. Moreover, the thickness of the adhesive agent may be made the same as that of the adhesive agent layer 5.

In the present invention, a lubricant is preferably attached to a surface of the base material layer 1 from the viewpoint of enhancing the moldability of the battery packaging material. The lubricant is not particularly limited but is preferably an amide-based lubricant. Specific examples of the amide-based lubricant include a saturated fatty acid amide, an unsaturated fatty acid amide, a substituted amide, a methylol amide, a saturated fatty acid bisamide, and an unsaturated fatty acid bisamide. Specific examples of the saturated fatty acid amide include lauric acid amide, palmitic acid amide, stearic acid amide, behenic acid amide, and hydroxystearic acid amide. Specific examples of the unsaturated fatty acid amide include oleic acid amide and erucic acid amide. Specific examples of the substituted amide include N-oleylpalmitic acid amide, N-stearylstearic acid amide, N-stearyloleic acid amide, N-oleylstearic acid amide, and N-stearylerucic acid amide. Specific examples of the methylol amide include methylolstearic acid amide. Specific examples of the saturated fatty acid bisamide include methylene-bis-stearic acid amide, ethylene-bis-capric acid amide, ethylene-bis-lauric acid amide, ethylene-bis-stearic acid amide, ethylene-bis-hydroxystearic acid amide, ethylene-bis-behenic acid amide, hexamethylene-bis-stearic acid amide, hexamethylene-bis-behenic acid amide, hexamethylene-hydroxystearic acid amide, N,N'-distearyladipic acid amide, and N,N'-distearylsebacic acid amide. Specific examples of the unsaturated fatty acid bisamide include ethylene-bis-oleic acid amide, ethylene-bis-erucic acid amide, hexamethylene-bis-oleic acid amide, N,N'-dioleyladipic acid amide, and N,N'-dioleylsebacic acid amide. Specific examples of the fatty acid ester amide include stearamide ethyl stearate. Specific examples of the aromatic bisamide include m-xylylene-bis-stearic acid amide, m-xylylene-bis-hydroxystearic acid amide, and N,N'-distearylisophthalic acid amide. The lubricant may be used singly, or alternatively two or more lubricants may be used in combination.

When the lubricant exists on a surface of the base material layer 1, the amount of the lubricant is not particularly limited but is, for example, preferably 3 $mg/m^2$ or more, more preferably 4 to 15 $mg/m^2$, and even more preferably 5 to 14 $mg/m^2$ in an environment with a temperature of 24° C. and a relative humidity of 60%.

The base material layer 1 may contain a lubricant. The lubricant existing on a surface of the base material layer 1 may be either one oozed out from a lubricant contained in a resin that constitutes the base material layer 1 or one applied on a surface of the base material layer 1.

The thickness (total thickness) of the base material layer 1 is preferably 4 μm or more, more preferably 6 to 60 μm, and even more preferably 10 to 50 μm from the viewpoint of enhancing the moldability of the battery packaging material and concurrently effectively suppressing the warp thereof.

[Adhesive Agent Layer 5]

In the battery packaging material of the present invention, the adhesive agent layer 5 is a layer provided between the base material layer 1 and the barrier layer 2 as necessary in order to firmly bonding these layers to each other.

The adhesive agent layer 5 is formed of an adhesive agent that can bond the base material layer 1 and the barrier layer 2. The adhesive agent to be used to form the adhesive agent layer 5 may be a two-liquid curable adhesive agent, or alternatively may be a one-liquid curable adhesive agent. Furthermore, the adhesive mechanism of the adhesive agent to be used for forming the adhesive agent layer 5 is not particularly limited and may be any one of a chemical reaction type, a solvent volatilization type, a heat melting type, a heat pressing type, and the like.

Specific examples of an adhesive component that can be used for forming the adhesive agent layer 5 include polyester-based resins such as polyethylene terephthalate, polybutylene terephthalate, polyethylene naphthalate, polybutylene naphthalate, polyethylene isophthalate, and copolyester; a polycarbonate-based adhesive agent; a polyether-based adhesive agent; a polyurethane-based adhesive agent; an epoxy-based resin; a phenolic resin-based resin; polyamide-based resins such as nylon 6, nylon 66, nylon 12, and a copolymerized polyamide; polyolefin-based resins such as a polyolefin, a carboxylic acid-modified polyolefin, and a metal-modified polyolefin, a polyvinyl acetate-based resin; a cellulose-based adhesive agent; a (meth)acrylic-based resin; a polyimide-based resin; amino resins such as a urea resin and a melamine resin; rubber such as chloroprene rubber, nitrile rubber, and styrene-butadiene rubber; and silicone-based resins. These adhesive components may be used singly or alternatively may be used in combination of two or more thereof. Among these adhesive components, a polyurethane-based adhesive agent is preferred.

The thickness of the adhesive agent layer 5 is not particularly limited as long as it exhibits a function as a layer to undergo bonding, and is, for example, about 1 to 10 μm, preferably about 2 to 5 μm.

[Barrier Layer 2]

In the battery packaging material, the barrier layer 2 is a layer having a function of preventing ingress of water vapor, oxygen, light, etc. into a battery, in addition to improving the strength of the battery packaging material. Specific examples of the metal that forms the barrier layer 2 include aluminum, stainless steel, and titanium, with aluminum being preferred. The barrier layer 2 can be formed of, for example, a metal foil, a metal deposition film, an inorganic oxide deposition film, a carbon-containing inorganic oxide deposition film, or a film provided with these deposition films. The barrier layer 2 is preferably formed of a metal foil, further preferably formed of an aluminum foil. From the viewpoint of preventing generation of wrinkles or pinholes in the barrier layer 2 during the production of the battery packaging material, the barrier layer is more preferably formed of a soft aluminum foil such as annealed aluminum (JIS H4160:1994 A8021H-O, JIS H4160:1994 A8079H-O, JIS H4000:2014 A8021P-O, JIS H4000:2014 A8079P-O).

The thickness of the barrier layer 2 is not particularly limited as long as it exhibits a function as a barrier layer against water vapor or the like, but can be adjusted to, for example, about 10 to 50 μm, preferably about 10 to 40 μm.

At least one surface, preferably both surfaces of the barrier layer 2 have preferably been subjected to a chemical conversion treatment for, for example, stabilizing the adhesion and preventing dissolution or corrosion. Here, the chemical conversion treatment is a treatment for forming an acid resistance film on a surface on a barrier layer. When the acid resistance film has been formed, the acid resistance film is included in the barrier layer 2. Examples of the chemical conversion treatment include a chromate treatment using a chromium compound such as chromium nitrate, chromium fluoride, chromium sulfate, chromium acetate, chromium oxalate, chromium biphosphate, acetylacetate chromate, chromium chloride, or chromium potassium sulfate; a phosphoric acid treatment using a phosphoric acid compound such as sodium phosphate, potassium phosphate, ammonium phosphate, or polyphosphoric acid; and a chemical conversion treatment using an aminated phenolic polymer having a repeating unit(s) represented by the following formulae (1) to (4). Among the chromium compounds, a chromic acid compound is preferred. In the aminated phenol polymer, a single type of the repeating units represented by the following formulae (1) to (4) may be contained, or alternatively any two or more types of repeating units may be contained in combination.

[Chemical Formula 1]

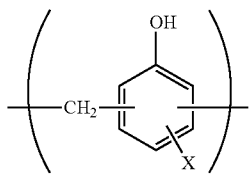
(1)

[Chemical Formula 2]

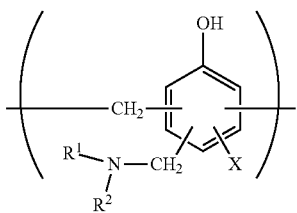
(2)

[Chemical Formula 3]

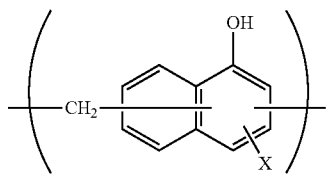
(3)

[Chemical Formula 4]

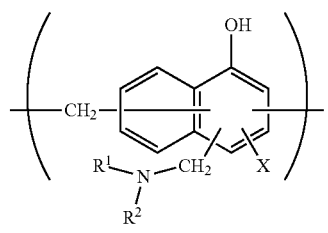
(4)

In the formulae (1) to (4), X represents a hydrogen atom, a hydroxy group, an alkyl group, a hydroxyalkyl group, an allyl group, or a benzyl group. $R^1$ and $R^2$ are identical or different, and each represent a hydroxy group, an alkyl group, or a hydroxyalkyl group. In the formulae (1) to (4), examples of the alkyl group represented by X, $R^1$ and $R^2$ include a linear or branched alkyl group with 1 to 4 carbon atoms, such as a methyl group, an ethyl group, a n-propyl group, an isopropyl group, a n-butyl group, an isobutyl group, and a tert-butyl group. Examples of the hydroxyalkyl group represented by X, $R^1$, and $R^2$ include a linear or branched alkyl group that is substituted with one hydroxy group and has 1 to 4 carbon atoms, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group, and a 4-hydroxybutyl group. In the formulae (1) to (4), the alkyl groups and the hydroxyalkyl groups represented by X, $R^1$, and $R^2$ may be either identical or different. In the formulae (1) to (4), X is preferably a hydrogen atom, a hydroxy group, or a hydroxyalkyl group. The number average molecular weight of the aminated phenol polymer having any of the repeating units represented by the formulae (1) to (4) is, for example, about 500 to 1,000,000, preferably about 1,000 to 20,000.

Examples of a chemical conversion treatment method for imparting corrosion resistance to the barrier layer 2 include a method in which the barrier layer 2 is coated with a dispersion of fine particles of a metal oxide such as aluminum oxide, titanium oxide, cerium oxide, or tin oxide, or barium sulfate in phosphoric acid, and baked at about 150° C. or higher to form an anticorrosive-treated layer on a surface of the barrier layer 2. A resin layer with a cationic polymer crosslinked with a crosslinking agent may be further formed on the corrosion resistance treatment layer. Here, examples of the cationic polymer include polyethyleneimine, an ion polymer complex formed of a polymer having polyethyleneimine and a carboxylic acid, a primary amine-grafted acrylic resin obtained by graft-polymerizing a primary amine to an acrylic main backbone, polyallylamine or derivatives thereof, and an aminophenol. These cationic polymers may be used singly or alternatively two or more thereof may be used in combination. Examples of the crosslinking agent include a compound having at least one functional group selected from the group consisting of an isocyanate group, a glycidyl group, a carboxyl group, and an oxazoline group, and a silane coupling agent. These crosslinking agents may be used singly or alternatively two or more thereof may be used in combination.

As for the chemical conversion treatment, only one chemical conversion treatment may be performed, or alternatively two or more chemical conversion treatments may be performed in combination. Furthermore, these chemical conversion treatments may be performed using one compound alone, or alternatively may be performed using two or more compounds in combination. Among the chemical conversion treatments, preferred are a chromate treatment and a chemical conversion treatment using a chromium compound, a phosphoric acid compound, and an aminated phenolic polymer in combination.

The amount of the acid resistance film to be formed on the surface of the barrier layer 2 in the chemical conversion treatment is not particularly limited, but, for example, when the above-mentioned chromate treatment is performed, it is desirable that the chromium compound be contained in an amount of about 0.5 to 50 mg, preferably about 1.0 to 40 mg in terms of chromium, the phosphorus compound be contained in an amount of about 0.5 to 50 mg, preferably about 1.0 to 40 mg in terms of phosphorus, and the aminated phenolic polymer be contained in an amount of about 1.0 to 200 mg, preferably about 5.0 to 150 mg, per 1 $m^2$ of the surface of the barrier layer 2.

The chemical conversion treatment is performed by applying a solution containing a compound to be used for forming the acid resistance film to a surface of the barrier layer 2 through, for example, bar coating, roll coating, gravure coating, or an immersion method, and then heating the barrier layer 2 such that the temperature of the barrier layer 2 becomes 70 to 200° C. The barrier layer 2 may be subjected to a degreasing treatment using an alkali immersion method, an electrolytic cleaning method, an acid cleaning method, an electrolytic acid cleaning method, or the like before the barrier layer 2 is subjected to the chemical conversion treatment. Performing such a degreasing treatment makes it possible to more effectively perform the chemical conversion treatment of the surface of the barrier layer 2.

[Cured Resin Layer 3]

In the present invention, the cured resin layer 3 is a layer provided between the barrier layer 2 and the heat-sealable resin layer 4 in order to enhance the moldability of the battery packaging material and concurrently suppress the warp thereof.

In the present invention, the cured resin layer 3 may be formed of a cured product of a resin composition. The cured resin layer 3 is, for example, one obtained by crosslinking and curing a resin composition. The cured resin layer 3 does not have a clear melting point, for example. The cured resin layer 3 is made of, for example, a cured product of a curable resin such as a thermosetting resin. In the present invention, a cured product of a resin composition containing an acid-modified polyolefin is preferable from the viewpoint of enhancing the moldability of the battery packaging material and concurrently effectively suppressing the warp thereof.

In the present invention, a polyolefin modified with an unsaturated carboxylic acid or its acid anhydride is preferred for use as the acid-modified polyolefin. That is, the resin forming the cured resin layer 3 may or may not include a polyolefin skeleton, but it preferably includes a polyolefin skeleton. The inclusion of the polyolefin skeleton in the resin forming the cured resin layer 3 can be analyzed by infrared spectroscopy, gas chromatography-mass spectrometry, or the like, and the analysis method is not particularly restricted. For example, measurement of a maleic anhydride-modified polyolefin by infrared spectroscopy detects peaks derived from maleic anhydride at wave numbers of around 1760 $cm^{-1}$ and around 1780 $cm^{-1}$. When the degree of acid modification is low, however, a peak becomes small to be sometimes undetected. In that case, analysis can be performed by nuclear magnetic resonance spectroscopy.

Furthermore, the acid-modified polyolefin may be further modified with a (meth)acrylic acid ester. The modified polyolefin further modified with a (meth)acrylic acid ester is obtained by acid-modifying a polyolefin using an unsaturated carboxylic acid or its acid anhydride and the (meth) acrylic acid ester in combination. In the present invention, "(meth)acrylic acid ester" means "acrylic acid ester" or "methacrylic acid ester". The acid-modified polyolefin may be used singly or alternatively two or more thereof may be used in combination.

The polyolefin to be acid-modified is not particularly limited as long as it is a resin containing at least an olefin as a monomer unit. The polyolefin can be constituted of, for example, at least one of polyethylene and polypropylene, and is preferably constituted of polypropylene. Polyethylene can be constituted of, for example, at least one of homopolyethylene and ethylene copolymer. Polypropylene can be constituted of, for example, at least one of homopolypropylene and propylene copolymer. Examples of the propylene copolymer include copolymers of propylene with other olefins, such as ethylene-propylene copolymers, propylene-butene copolymers, and ethylene-propylene-butene copolymers. The proportion of the propylene unit contained in the polypropylene is preferably adjusted to about 50 to 100 mol %, and more preferably about 80 to 100 mol % from the viewpoint of enhancing the moldability of the battery packaging material and concurrently suppressing the warp thereof. Further, the proportion of the ethylene unit contained in the polyethylene is preferably adjusted to about 50 to 100 mol %, and more preferably about 80 to 100 mol % from the viewpoint of enhancing the moldability of the battery packaging material and concurrently suppressing the warp thereof. The ethylene copolymer and the propylene copolymer may each be either a random copolymer or a block copolymer. Moreover, the ethylene copolymer and the propylene copolymer may be either crystalline or noncrystalline, and may be a copolymer or a mixture thereof. The polyolefin may be formed of one homopolymer or copolymer, or may be formed of two or more homopolymers or copolymers.

Examples of the unsaturated carboxylic acid include acrylic acid, methacrylic acid, maleic acid, itaconic acid, fumaric acid, and crotonic acid. Moreover, as the acid anhydride, the acid anhydrides of the unsaturated carboxylic acids mentioned above as examples are preferable, and maleic anhydride and itaconic anhydride are more preferable. The acid-modified polyolefin may be either one modified with one unsaturated carboxylic acid or its acid anhydride or one modified with two or more unsaturated carboxylic acids or their acid anhydrides.

Examples of the (meth)acrylic acid ester include an esterified product of (meth)acrylic acid and an alcohol having 1 to 30 carbon atoms, preferably an esterified product of (meth)acrylic acid and an alcohol having 1 to 20 carbon atoms. Specific examples of the (meth)acrylic acid esters include methyl (meth)acrylate, ethyl (meth)acrylate, propyl (meth)acrylate, butyl (meth)acrylate, hexyl (meth)acrylate, octyl (meth)acrylate, decyl (meth)acrylate, lauryl (meth) acrylate, and stearyl (meth)acrylate. In the modification of a polyolefin, (meth)acrylic acid esters may be used singly or alternatively two or more thereof may be used.

The proportion of the unsaturated carboxylic acid or the acid anhydride thereof in the acid-modified polyolefin is preferably about 0.1 to 30% by mass, and more preferably about 0.1 to 20% by mass. By setting it within such a range, it is possible to enhance the moldability of the battery packaging material and concurrently effectively suppress the warp thereof.

The proportion of the (meth)acrylic acid ester in the acid-modified polyolefin is preferably about 0.1 to 40% by mass, and more preferably about 0.1 to 30% by mass. By setting it within such a range, it is possible to enhance the moldability of the battery packaging material and concurrently effectively suppress the warp thereof.

The weight average molecular weight of the acid-modified polyolefin is preferably about 6,000 to 200,000, and more preferably about 8,000 to 150,000. In the present invention, the weight average molecular weight of an acid-modified polyolefin is a value measured by gel permeation chromatography (GPC) under the condition of using polystyrene as a standard sample. The melting peak temperature of the acid-modified polyolefin is preferably about 50 to 120° C., and more preferably about 50 to 100° C. In the present invention, the melting peak temperature of an acid-modified polyolefin means an endothermic peak temperature in differential scanning calorimetry.

With respect to the acid-modified polyolefin, the method of modifying a polyolefin is not particularly limited; for example, it is only required that an unsaturated carboxylic acid or an acid anhydride thereof or a (meth)acrylic ester is copolymerized with the polyolefin. Examples of such copolymerization include random copolymerization, block copolymerization, and graft copolymerization (graft modification), and preferably include graft copolymerization.

Moreover, from the viewpoint of enhancing the moldability of the battery packaging material and concurrently effectively suppressing the warp thereof, the resin constituting the cured resin layer 3 is preferably a cured product of a resin composition containing at least one species selected from the group consisting of an isocyanate group-containing compound, an oxazoline group-containing compound, and an epoxy resin (epoxy compounds), and a urethane resin, and particularly preferably a cured product of a resin composition containing at least one species selected from the group consisting of an isocyanate group-containing compound and an epoxy resin. The resin constituting the cured resin layer 3 is more preferably a cured product of a resin composition containing at least one species of these compounds and resins, and the above-described acid-modified polyolefin. When an unreacted substance of a curing agent such as an isocyanate group-containing compound, an oxazoline group-containing compound, or an epoxy resin is left in the resin constituting the cured resin layer 3, the presence of the unreacted substance can be confirmed by, for example, time-of-flight secondary ion mass spectrometry (TOF-SIMS).

From the viewpoint of enhancing the moldability of the battery packaging material and concurrently effectively suppressing the warp thereof, the resin constituting the cured resin layer 3 is preferably a cured product of a resin composition containing a curing agent having at least one member selected from the group consisting of an oxygen atom, a heterocyclic ring, a C=N bond, and a C—O—C bond. Examples of the curing agent having a heterocyclic ring include an oxazoline group-containing curing agent and an epoxy group-containing curing agent. Examples of the curing agent having a C=N bond include an oxazoline group-containing curing agent and an isocyanate group-containing curing agent. Examples of the curing agent having a C—O—C bond include an oxazoline group-containing curing agent, an epoxy group-containing curing agent, and a urethane resin. The fact that the resin constituting the cured resin layer 3 is a cured product of a resin composition containing such a curing agent can be confirmed by a method such as gas chromatography-mass spectrometry (GCMS), infrared spectroscopy (IR), time-of-flight secondary ion mass spectrometry (TOF-SIMS), or X-ray photoemission spectroscopy (XPS).

The compound having an isocyanate group is not particularly limited, and a polyfunctional isocyanate compound is mentioned from the viewpoint of enhancing the moldability of the battery packaging material and concurrently effectively suppressing the warp thereof. The polyfunctional isocyanate compound is not particularly limited as long as it is a compound having two or more isocyanate groups. Specific examples of the polyfunctional isocyanate-based curing agent include isophorone diisocyanate (IPDI), hexamethylene diisocyanate (HDI), tolylene diisocyanate (TDI), diphenylmethane diisocyanate (MDI), polymerized or nurated products thereof, mixtures thereof, and copolymerized products thereof with another polymer.

The content of the compound having an isocyanate group in the cured resin layer 3 is preferably in the range of 0.1 to 50% by mass, and more preferably in the range of 0.5 to 40% by mass, in the resin composition constituting the cured resin layer 3. Thanks to this, it is possible to enhance the moldability of the battery packaging material and concurrently effectively suppress the warp thereof.

The compound having an oxazoline group is not particularly limited as long as it is a compound having an oxazoline skeleton. Examples of the compound having an oxazoline group include those having a polystyrene main chain and those having an acrylic main chain. Examples of a commercially available product include EPOCROS series produced by Nippon Shokubai Co., Ltd.

The proportion of the compound having an oxazoline group in the cured resin layer 3 is preferably in the range of 0.1 to 50% by mass, and more preferably in the range of 0.5 to 40% by mass, in the resin composition constituting the cured resin layer 3. Thanks to this, it is possible to enhance the moldability of the battery packaging material and concurrently effectively suppress the warp thereof.

The epoxy resin (epoxy compound) is not particularly limited as long as it is a resin capable of forming a crosslinked structure by epoxy groups present in the molecule thereof, and a known epoxy resin can be used. The weight average molecular weight of the epoxy resin is preferably about 50 to about 2,000, more preferably about 100 to about 1,000, and even more preferably about 200 to about 800. In the present invention, the weight average molecular weight of an epoxy resin is a value measured by gel permeation chromatography (GPC) under the condition of using polystyrene as a standard sample.

Examples of the epoxy resin include bisphenol A diglycidyl ether, modified bisphenol A diglycidyl ether, novolak glycidyl ether, glycerin polyglycidyl ether, and polyglycerin polyglycidyl ether. The epoxy resin may be used singly, or alternatively two or more species thereof may be used in combination.

The proportion of the epoxy resin in the cured resin layer 3 is preferably in the range of 0.1 to 50% by mass, and more preferably in the range of 0.5 to 40% by mass, in the resin composition constituting the cured resin layer 3. Thanks to this, it is possible to enhance the moldability of the battery packaging material and concurrently effectively suppress the warp thereof.

The urethane resin is not particularly limited, and known urethane resins can be used. The resin constituting the cured resin layer 3 may be, for example, a cured product of a two-liquid curable urethane resin.

The proportion of the urethane resin in the cured resin layer 3 is preferably in the range of 0.1 to 50% by mass, and more preferably in the range of 0.5 to 40% by mass, in the resin composition constituting the cured resin layer 3. Thanks to this, it is possible to enhance the moldability of the battery packaging material and concurrently effectively suppress the warp thereof.

In the present invention, when the resin constituting the cured resin layer 3 is a cured product of a resin composition containing at least one species selected from the group consisting of a compound having an isocyanate group, a compound having an oxazoline group, and an epoxy resin, and the above-described acid-modified polyolefin, the acid-modified polyolefin functions as a main agent, and the compound having an isocyanate group, the compound having an oxazoline group, and the epoxy resin each function as a curing agent.

In the present invention, between the barrier layer 2 and the cured resin layer 3 and between the cured resin layer 3 and the heat-sealable resin layer 4 may be provided other layers. Examples of the other layers include a heat resistance resin layer and a short circuit prevention layer. The heat resistance resin layer can be provided, for example, in order to suppress excessive collapse of a heat-sealable portion when the battery packaging material is subjected to heat sealing, and can be constituted of, for example, a curable adhesive agent or an extrusion resin with low flowability. The short circuit prevention layer can be provided in order to further enhance the short circuit prevention function of the battery packaging material, and can be constituted of, for example, a non-woven fabric, a polyester resin, or the like.

From the viewpoint of enhancing the moldability of the battery packaging material and concurrently effectively suppressing the warp thereof, as to the thickness of the cured resin layer 3, the upper limit thereof is preferably about 40 μm or less, more preferably about 30 μm or less, and even more preferably about 20 μm or less, and the lower limit is preferably about 0.5 μm or more, more preferably about 1 μm or more, and even more preferably about 2 μm or more. The range of the thickness of the cured resin layer 3 may preferably be about 0.5 to 40 μm, about 0.5 to 30 μm, about 0.5 to 20 μm, about 1 to 40 μm, about 1 to 30 μm, about 1 to 20 μm, about 2 to 40 μm, about 2 to 30 μm, or about 2 to 20 μm.

[Heat-Sealable Resin Layer 4]

In the battery packaging material of the present invention, the heat-sealable resin layer 4 corresponds to an innermost layer and is a layer whose portions are heat-sealed to each other during assembly of a battery to hermetically seal a battery element in the heat-sealable resin layer.

The resin component to be used for the heat-sealable resin layer 4 is not particularly limited as long as it is heat-sealable, and examples thereof include a polyolefin, a cyclic polyolefin, a carboxylic acid-modified polyolefin, and a carboxylic acid-modified cyclic polyolefin. In other words, the heat-sealable resin layer 4 may or may not contain a polyolefin skeleton, but preferably contains a polyolefin skeleton. The inclusion of a polyolefin skeleton in the heat-sealable resin layer 4 can be analyzed by, for example, infrared spectroscopy, gas chromatography-mass spectrometry, or the like, and the analysis method is not particularly restricted. For example, measurement of a maleic anhydride-modified polyolefin by infrared spectroscopy detects peaks derived from maleic anhydride at wave numbers of around 1760 $cm^{-1}$ and around 1780 $cm^{-1}$. When the degree of acid modification is low, however, a peak becomes small to be sometimes undetected. In that case, analysis can be performed by nuclear magnetic resonance spectroscopy.

Specific examples of the polyolefin include polyethylene such as low-density polyethylene, medium-density polyethylene, high-density polyethylene, and linear low-density polyethylene; polypropylene such as homopolypropylene, block copolymers of polypropylene (e.g., block copolymers of propylene and ethylene), and random copolymers of polypropylene (e.g., random copolymers of propylene and ethylene); and terpolymers of ethylene-butene-propylene. Among these polyolefins, polyethylene and polypropylene are preferred.

The cyclic polyolefin is a copolymer of an olefin and a cyclic monomer, and examples of the olefin as a constituent monomer of the cyclic polyolefin include ethylene, propylene, 4-methyl-1-pentene, styrene, butadiene, and isoprene. Examples of the cyclic monomer as a constituent monomer of the cyclic polyolefin include cyclic alkenes such as norbornene; specific examples thereof include cyclic dienes such as cyclopentadiene, dicyclopentadiene, cyclohexadiene, and norbornadiene. Among these polyolefins, cyclic alkenes are preferred, and norbornene is further preferred.

The carboxylic acid-modified polyolefin is a polymer obtained by modifying the polyolefin with a carboxylic acid through block copolymerization or graft copolymerization. Examples of the carboxylic acid to be used for the modification include maleic acid, acrylic acid, itaconic acid, crotonic acid, maleic anhydride, and itaconic anhydride.

The carboxylic acid-modified cyclic polyolefin is a polymer obtained by copolymerizing a part of a monomer that constitutes the cyclic polyolefin with an α,β-unsaturated carboxylic acid or an anhydride thereof, or by block-copolymerizing or graft-copolymerizing the cyclic polyolefin with an α,β-unsaturated carboxylic acid or an anhydride thereof. The cyclic polyolefin to be modified with a carboxylic acid is the same as described above. The carboxylic acid to be used for the modification is the same as that to be used for the modification of the carboxylic acid-modified polyolefin.

Among these resin components, a carboxylic acid-modified polyolefin is preferred, and carboxylic acid-modified polypropylene is more preferred.

The heat-sealable resin layer 4 may be formed of one resin component alone or a blended polymer obtained by combining two or more resin components. Further, the heat-sealable resin layer 4 may be formed of only one layer, or alternatively may be formed of two or more layers with the identical resin component or different resin components.

In addition, a lubricant may be present on the surface of the heat-sealable resin layer 4 as necessary from the viewpoint of improving the moldability of the battery packaging material. The lubricant is not particularly limited and known lubricants can be used, and examples thereof include those provided as examples above for the base material layer 1. The lubricant may be used singly, or alternatively two or more species thereof may be used in combination. The amount of the lubricant present on the surface of the heat-sealable resin layer 4 is not particularly limited, and from the viewpoint of enhancing the moldability of the battery packaging material, it is preferably about 10 to 50 $mg/m^2$, and more preferably about 15 to 40 $mg/m^2$ in an environment with a temperature of 24° C. and a relative humidity of 60%.

The heat-sealable resin layer 4 may contain a lubricant. The lubricant existing on a surface of the heat-sealable resin layer 4 may be one oozed out from a lubricant contained in a resin that forms the heat-sealable resin layer 4, or one applied on a surface of the heat-sealable resin layer 4.

In the battery packaging material of the present invention, despite the fact that at least one layer of the base material layer is formed of a polybutylene terephthalate film and the above-mentioned X/Y is 1.02 N/μm or more, the warp of the battery packaging material is effectively suppressed by providing the cured resin layer 3. Usually, the warp of a battery packaging material tends to increase as the thickness of a heat-sealable resin layer 4 is reduced, but in the battery packaging material of the present invention, the warp thereof can be effectively suppressed even if the thickness of the heat-sealable resin layer 4 is small, for example, within the range of about 100 μm or less. From the viewpoint of enhancing the moldability of the battery packaging material and concurrently effectively suppressing the warp thereof, the thickness of the heat-sealable resin layer 4 is preferably about 10 to 80 μm, and more preferably about 20 to 50 μm.

Furthermore, from the viewpoint of enhancing the moldability of the battery packaging material and concurrently effectively suppressing the warp thereof, the upper limit of the total thickness of the cured resin layer 3 and the heat-sealable resin layer 4 is preferably about 90 μm or less, and more preferably about 80 μm or less, and the lower limit is preferably about 10 μm or more, and more preferably about 20 μm or more. The range of the total thickness may preferably be about 10 to 90 μm, about 20 to 90 μm, about 10 to 80 μm, or about 20 to 80 μm.

[Surface Coating Layer 6]

In the battery packaging material of the present invention, the surface coating layer 6 may be provided on the base material layer 1 (a surface of a base material layer 1 opposite to the barrier layer 2) as necessary, for the purpose of improving designability, electrolytic solution resistance, scratch resistance, moldability, etc. The surface coating layer 6 is a layer situated as an outermost layer when a battery is assembled.

The surface coating layer 6 can be formed of, for example, polyvinylidene chloride, a polyester resin, a urethane resin, an acrylic resin, or an epoxy resin. Among these, the surface coating layer 6 is preferably formed of a two-liquid curable resin. Examples of the two-liquid curable resin for forming the surface coating layer 6 include a two-liquid curable urethane resin, a two-liquid curable polyester resin, and a two-liquid curable epoxy resin. The surface coating layer 6 may contain an additive.

Examples of the additive include particles with a particle diameter of about 0.5 nm to 5 μm. The material for the additive is not particularly limited, and examples thereof include metal, a metal oxide, an inorganic substance, and an organic substance. The shape of the additive is not particularly limited, and examples thereof include a spherical shape, a fibrous shape, a plate shape, an indefinite shape, and a balloon shape. Specific examples of the additive include talc, silica, graphite, kaolin, montmorilloide, montmorillonite, synthetic mica, hydrotalcite, silica gel, zeolite, aluminum hydroxide, magnesium hydroxide, zinc oxide, magnesium oxide, aluminum oxide, neodymium oxide, antimony oxide, titanium oxide, cerium oxide, calcium sulfate, barium sulfate, calcium carbonate, calcium silicate, lithium carbonate, calcium benzoate, calcium oxalate, magnesium stearate, alumina, carbon black, carbon nanotubes, high-melting-point nylon, crosslinked acrylic, crosslinked styrene, crosslinked polyethylene, benzoguanamine, gold, aluminum, copper, and nickel. These additives may be used singly, or alternatively two or more thereof may be used in combination. Among these additives, silica, barium sulfate, and titanium oxide are preferred from the viewpoint of dispersion stability or costs. The surface of the additives may have been subjected to various types of surface treatment, such as an insulation treatment and a dispersibility enhancing treatment.

The method for forming the surface coating layer 6 is not particularly limited, and examples thereof include a method of applying a two-liquid curable resin for forming the surface coating layer 6 onto one surface of the base material layer 1. When an additive is blended, application may be performed after the additive is added to and mixed with the two-liquid curable resin.

The thickness of the surface coating layer 6 is not particularly limited as long as the layer exhibits the above-described functions as the surface coating layer 6, and it is, for example, about 0.5 to 10 μm, and preferably about 1 to 5 μm.

3. Method for Producing Battery Packaging Material

The method for producing the battery packaging material of the present invention is not particularly limited as long as a laminate including layers each having a prescribed composition is obtained. Specifically, it is only required in the method for producing a battery packaging material of the present invention that the method includes a step of obtaining a laminate by laminating at least a base material layer, a barrier layer, a cured resin layer and a heat-sealable resin layer in this order, wherein at least one layer of the base material layer is formed of a polybutylene terephthalate film, and a value (X/Y) determined by dividing a piercing strength X (N) in the case of piercing the laminate from its base material layer side measured by a method in accordance with a provision of JIS Z1707:1997 by a thickness Y (μm) of the polybutylene terephthalate film is 1.02 N/μm or more.

Furthermore, in the present invention, the step of obtaining the laminate that is to constitute the battery packaging material and its subsequent step (the step following the lamination may be, for example, a step of firmly adhering the cured resin layer 3 to the heat-sealable resin layer 4) are particularly preferably configured such that the sum total of the product of the temperature T (° C.) and the time S (minutes) at the time when the polybutylene terephthalate film is exposed to 100° C. or more is 160 or less. For example, in a conventional method for producing a battery packaging material, a polybutylene terephthalate film may be exposed to 100° C. or more when laminating layers, for example, in a lamination step. In the battery packaging material of the present invention, when a cured resin layer 3 is formed by curing a resin composition, a polybutylene terephthalate film may be exposed to 100° C. or more. After the lamination step, the cured resin layer 3 and the heat-sealable resin layer 4 are subjected to a step of firmly adhering them. This step is generally carried out under conditions of about 100 to 200° C. and about 1 to 5 minutes. For this reason, a large amount of heat is applied to the polybutylene terephthalate film in this step. Since the battery packaging material becomes prone to warp if such a large amount of heat is applied, it is preferable in the battery packaging material of the present invention that the sum total of the product of the temperature T (° C.) and the time S (minutes) be set to 160 or less. This makes it possible to more effectively suppress the warp of the battery packaging material.

As to the sum total of the product of the temperature T (° C.) and the time S (minutes) at the time when the polybutylene terephthalate film is exposed to 100° C. or more, the upper limit thereof is more preferably about 75 or less, whereas there is no particular lower limit, but the lower limit is about 1 or more, for example. The range of the sum total of the product is preferably about 1 to 160, and more preferably about 1 to 75.

As to the temperature T (° C.) at the time when the polybutylene terephthalate film is exposed to 100° C. or more, the upper limit thereof is preferably about 160° C. or less, and more preferably about 150° C. or less, and the lower limit is preferably about 100° C. or more. The range of the temperature T (° C.) is preferably about 100 to 160° C., and more preferably about 100 to 150° C. As to the time S (minutes) at the time when the polybutylene terephthalate film is exposed to 100° C. or more, the upper limit thereof is preferably about 1.0 minutes or less, and more preferably about 0.5 minutes or less, and the lower limit is preferably 0.01 minutes or more, and more preferably 0.05 minutes or more. The range of the time S (minutes) is preferably about 0.01 to 1.0 minutes, about 0.01 to 0.5 minutes, about 0.05 to 1.0 minutes, or about 0.05 to 0.5 minutes. In the process for producing the battery packaging material of the present invention, the aging step is preferably carried out for about 24 to 120 hours in a low temperature environment of about 40 to 90° C.

One example of the method for producing a battery packaging material of the present invention is as follows. First, a laminate in which the base material layer 1, the adhesive agent layer 5, and the barrier layer 2 are laminated in this order (the laminate may hereinafter be denoted as the "laminate A") is formed. Specifically, the formation of the laminate A can be performed by a dry lamination method that includes applying an adhesive agent to be used for forming the adhesive agent layer 5 onto the base material layer 1 or the barrier layer 2 having a surface thereof having been subjected to a chemical conversion treatment as necessary by an application method such as gravure coating or roll coating, followed by drying, then laminating the barrier layer 2 or the base material layer 1, and curing the adhesive agent layer 5.

Next, a cured resin layer 3 and a heat-sealable resin layer 4 are laminated in this order on the barrier layer 2 of the laminate A. Examples of the lamination method include (1) a method in which a resin composition for forming the cured resin layer 3 is applied onto the barrier layer 2 of the laminate A and dried, then a film for forming the heat-sealable resin layer 4 is laminated on the resin composition, and the resin composition is cured (for example, heat-cured).

When a surface coating layer 6 is provided, the surface coating layer 6 is laminated on the surface of the base material layer 1 opposite to the barrier layer 2. The surface coating layer 6 can be formed by, for example, applying the above-described resin for forming the surface coating layer 6 to the surface of the base material layer 1. The order of the step of laminating the barrier layer 2 on the surface of the base material layer 1 and the step of laminating the surface coating layer 6 on the surface of the base material layer 1 is not particularly limited. For example, the surface coating layer 6 may be formed on the surface of the base material layer 1, and then the barrier layer 2 may be formed on the surface of the base material layer 1 opposite to the surface coating layer 6.

As described above, there is formed a laminate composed of the surface coating layer 6 provided as necessary/the base material layer 1/the adhesive agent layer 5 provided as necessary/the barrier layer 2 having a surface thereof subjected to a chemical conversion treatment as necessary/the cured resin layer 3/the heat-sealable resin layer 4. As described above, in the present invention, the battery packaging material may be aged under the conditions described above. The laminate may be further subjected to a heating treatment such as that of heat roll contact type, hot air type or near- or far-infrared ray type, for enhancing the bondability of the adhesive agent layer 5.

In the battery packaging material of the present invention, the layers that constitute the laminate may be subjected to a surface activation treatment such as a corona treatment, a blast treatment, an oxidation treatment, or an ozone treatment as necessary, in order to improve or stabilize film formability, lamination processing, and final product secondary processing (pouching and embossing molding) suitability.

4. Applications of Battery Packaging Material

The battery packaging material of the present invention is used as a packaging for hermetically sealing and containing a battery element such as a positive electrode, a negative electrode, and an electrolyte therein. That is, a battery element including at least a positive electrode, a negative electrode, and an electrolyte can be stored in a packaging formed of the battery packaging material of the present invention to form a battery.

Specifically, a battery element including at least a positive electrode, a negative electrode, and an electrolyte is covered with the battery packaging material of the present invention such that a flange part (a region where portions of a heat-sealable resin layer are in contact with each other) can be formed on a periphery of the battery element while metal terminals connected to the positive electrode and the negative electrode, respectively are allowed to extrude exteriorly, and the portions of the heat-sealable resin layer at the flange part are hermetically heat-sealed to each other, thereby providing a battery produced by using the battery packaging material. When a battery element is stored in a packaging formed of the battery packaging material of the present invention, the packaging is formed such that a heat-sealable resin portion of the battery packaging material of the present invention comes inside (the surface in contact with the battery element).

The battery packaging material of the present invention may be used for either a primary battery or a secondary battery, but it is preferably used for a secondary battery. The type of the secondary battery to which the battery packaging material of the present invention is applied is not particularly limited, and examples thereof include a lithium ion battery, a lithium ion polymer battery, a lead storage battery, a nickel-hydrogen storage battery, a nickel-cadmium storage battery, a nickel-iron storage battery, a nickel-zinc storage battery, a silver oxide-zinc storage battery, a metal-air battery, a polyvalent cation battery, a condenser, and a capacitor. Among these secondary batteries, preferred secondary batteries to which the battery packaging material of the present invention is applied include lithium ion batteries and lithium ion polymer batteries.

5. Other Methods for Producing Battery Packaging Material

The present invention can also provide the following method for producing a battery packaging material.

A method for producing a battery packaging material, the method including a step of obtaining a laminate by laminating at least a base material layer, a barrier layer, a cured resin layer and a heat-sealable resin layer in this order, wherein at least one layer of the base material layer is formed of a polybutylene terephthalate film, and in the step of obtaining the laminate and a following step thereof, the sum total of a product of a temperature T (° C.) and a time S (minutes) when the polybutylene terephthalate film is exposed to 100° C. or more is set to 160 or less.

That is, in the production method of the present invention, the step of obtaining the laminate that is to constitute the battery packaging material and its subsequent step (the step following the lamination may be, for example, a step of firmly adhering the cured resin layer 3 to the heat-sealable resin layer 4) are characterized by being configured such that the sum total of the product of the temperature T (° C.) and the time S (minutes) at the time when the polybutylene terephthalate film is exposed to 100° C. or more is 160 or less. In a conventional method for producing a battery packaging material, a polybutylene terephthalate film may be exposed to 100° C. or more when laminating layers, for example, in a lamination step. In the above-described battery packaging material of the present invention, when a cured resin layer 3 is formed by curing a resin composition, a polybutylene terephthalate film may be exposed to 100° C. or more. Furthermore, after the lamination step, the cured resin layer 3 and the heat-sealable resin layer 4 are subjected to a step of firmly adhering them. This step is generally carried out under conditions of about 100 to 200° C. and about 1 to 5 minutes. For this reason, a large amount of heat is applied to the polybutylene terephthalate film in this step. When such a large amount of heat is applied, the battery packaging material becomes prone to warp. In contrast, in the method for producing a battery packaging material of the present invention, since the sum total of the product of the temperature T (° C.) and the time S (minutes) is set to 160 or less, the warp of the battery packaging material can be effectively suppressed.

As to the sum total of the product of the temperature T (° C.) and the time S (minutes) at the time when the polybutylene terephthalate film is exposed to 100° C. or more, the upper limit thereof is preferably about 140 or less, and more preferably about 75 or less, whereas there is no particular lower limit, but the lower limit is about 1 or more, for example. The range of the sum total of the product is preferably about 1 to 160 or about 1 to 140, and more preferably about 1 to 75.

As to the temperature T (° C.) at the time when the polybutylene terephthalate film is exposed to 100° C. or more, the upper limit thereof is preferably about 160° C. or less, and more preferably about 150° C. or less, and the lower limit is preferably about 100° C. or more, and more preferably about 140° C. or more. The range of the temperature T (° C.) is preferably about 100 to 160° C., about 100 to 150° C., or about 100 to 140° C. As to the time S (minutes) at the time when the polybutylene terephthalate film is exposed to 100° C. or more, the upper limit thereof is preferably about 1.0 minutes or less, and more preferably about 0.5 minutes or less, and the lower limit is preferably 0.01 minutes or more, and more preferably 0.05 minutes or more. The range of the time S (minutes) is preferably about 0.01 to 1.0 minutes, about 0.01 to 0.5 minutes, about 0.05 to 1.0 minutes, or about 0.05 to 0.5 minutes. In the process for producing the battery packaging material of the present invention, the aging step is preferably carried out for about 24 to 120 hours in a low temperature environment of about 40 to 90° C.

6. Polybutylene Terephthalate Film for Battery Packaging Material

The polybutylene terephthalate film for a battery packaging material of the present invention is a polybutylene terephthalate film to be used for a base material layer of a battery packaging material. As described above, the battery packaging material is constituted of a laminate including a base material layer, a barrier layer, a cured resin layer and a heat-sealable resin layer in this order. In addition, in the battery packaging material, the value determined by dividing a piercing strength X (N) in the case of piercing the laminate from its base material layer side measured by a method in accordance with a provision of JIS Z1707:1997 by a thickness Y (μm) of the polybutylene terephthalate film is 1.02 N/μm or more. The details of the battery packaging material and the polybutylene terephthalate film are as described above.

EXAMPLES

The present invention is described in detail below by way of examples and comparative examples It, however, is to be noted that the present invention is not limited to the examples.

Examples 1 to 3

<Production of Battery Packaging Material>

A barrier layer was laminated on a base material layer by a dry lamination method. As the base material layer, biaxially stretched polybutylene terephthalate films (PBT films) in each of which the below-described relationship (X/Y) between the piercing strength X and the thickness Y was a value shown in Table 1 were used. In addition, as the barrier layer, an aluminum alloy foil (JIS H4160: 1994 A8021 H-O, thickness: 35 μm) subjected to chemical conversion treatment on both surfaces thereof was used. Specifically, a two-liquid urethane adhesive agent (a polyol compound and an aromatic isocyanate-based compound) was applied to one surface of the aluminum alloy foil to form an adhesive agent layer (thickness: 3 μm) on the barrier layer. Next, the adhesive agent layer on the barrier layer and the base material layer were laminated together, and then subjected to an aging treatment at 40° C. for 24 hours to prepare a laminate having the base material layer/the adhesive agent layer/the barrier layer. The chemical conversion treatment of the aluminum foil used as the barrier layer was performed by applying a treatment solution containing a phenol resin, a chromium fluoride compound, and phosphoric acid to both surfaces of the aluminum foil using a roll coating method, such that the amount of chromium applied became 10 mg/m$^2$ (dry mass), followed by baking for 20 seconds under conditions such that the film temperature became 180° C. or higher.

Next, a resin composition with the composition described in Table 1 was applied (the thickness after curing is described in Table 1) on the barrier layer of the laminate, and dried in an oven at 120° C. for 10 seconds. Next, an unstretched polypropylene film (CPP) was laminated on the dried resin composition to form a heat-sealable resin layer having a thickness of 30 μm. Next, heat pressure bonding was performed at 120° C. and a surface pressure of 0.5 MPa for 10 seconds with a hot press machine to bring the resin composition and the CPP into firm contact, and thus a laminated film in which a base material layer, an adhesive agent layer, a barrier layer, a cured resin layer, and a heat-sealable resin layer were laminated in this order was obtained. Next, the laminated film was subjected to an aging step to obtain battery packaging materials of Examples 1 to 3. In Examples 1 to 3, the aging step was performed at 40° C. for 48 hours.

In the production processes of the battery packaging materials of Examples 1 to 3, the temperature T (° C.) and the time S (minutes) at which the polybutylene terephthalate films were exposed to 100° C. or more were only the above-described 120° C. and 20 seconds.

Comparative Examples 1 and 2

<Production of Battery Packaging Material>

A barrier layer was laminated on a base material layer by a dry lamination method. Specifically, a two-liquid urethane adhesive agent (a polyol compound and an aromatic isocyanate-based compound) was applied to one surface of the aluminum alloy foil to form an adhesive agent layer (thickness: 3 μm) on the barrier layer. Next, the adhesive agent layer on the barrier layer and the base material layer were laminated together, and then subjected to an aging treatment at 40° C. for 24 hours to prepare a laminate having the base material layer/the adhesive agent layer/the barrier layer. As the base material layer, biaxially stretched polybutylene terephthalate films (PBT films) in each of which the below-described relationship (X/Y) between the piercing strength X and the thickness Y was a value shown in Table 1 were used. The same aluminum alloy foil as in Examples 1 to 3 was used as the barrier layer. Next, onto the barrier layer of the laminate, an adhesive layer (thickness: 20 μm, disposed on the barrier layer side) made of a maleic anhydride-modified polypropylene resin and a heat-sealable resin layer (thickness: 15 μm, the innermost layer) made of a random polypropylene resin were co-extruded, and thus a laminated film in which a base material layer, an adhesive agent layer, a barrier layer, an adhesive layer, and a heat-sealable resin layer were laminated in this order was obtained. Next, the laminated film was subjected to an aging step to obtain battery packaging materials of Comparative Examples 1 and 2. In Comparative Examples 1 and 2, the aging step was performed at 190° C. for 2 minutes. In the production processes of the battery packaging materials of Comparative Examples 1 and 2, the temperature T (° C.) and the time S (minutes) at which the polybutylene terephthalate films were exposed to 100° C. or more were the above-described 190° C. and 2 minutes.

Comparative Examples 3 and 4

<Production of Battery Packaging Material>

A barrier layer was laminated on a base material layer by a dry lamination method. Specifically, a two-liquid urethane adhesive agent (a polyol compound and an aromatic isocyanate-based compound) was applied to one surface of the aluminum alloy foil to form an adhesive agent layer (thickness: 3 μm) on the barrier layer. Next, the adhesive agent layer on the barrier layer and the base material layer were laminated together, and then subjected to an aging treatment at 40° C. for 24 hours to prepare a laminate having the base material layer/the adhesive agent layer/the barrier layer. In Comparative Example 3, a stretched nylon film (ONy film) in which the below-described relationship (X/Y) between the piercing strength X and the thickness Y was the value shown in Table 1 was used as the base material layer. In Comparative Example 4, a biaxially stretched polyethylene terephthalate film (PET film) in which the below-described relationship (X/Y) between the piercing strength X and the thickness Y was the value shown in Table 1 was used as the base material layer. The same aluminum alloy foil as in Examples 1 to 3 was used as the barrier layer.

Next, a resin composition with the composition described in Table 1 was applied (the thickness after curing is described in Table 1) on the barrier layer of the laminate, and dried in an oven at 120° C. for 10 seconds. Next, an unstretched polypropylene film (CPP) was laminated on the dried resin composition to form a heat-sealable resin layer having a thickness of 30 Next, heat pressure bonding was performed at 120° C. and a surface pressure of 0.5 MPa for 10 seconds with a hot press machine to bring the resin composition and the CPP into firm contact, and thus a laminated film in which a base material layer, an adhesive agent layer, a barrier layer, a cured resin layer, and a heat-sealable resin layer were laminated in this order was obtained. Next, the laminated film was subjected to an aging step to obtain battery packaging materials of Comparative Examples 3 to 4. In Comparative Examples 3 to 4, the aging step was performed at 40° C. for 48 hours.

In the production processes of the battery packaging materials of Comparative Examples 3 and 4, the temperature T (° C.) and the time S (minutes) at which the polybutylene terephthalate films were exposed to 100° C. or more were only the above-described 120° C. and 20 seconds as in Examples 1 to 3.

Reference Example 1

<Production of Battery Packaging Material>

In the same manner as in Example 1, a laminate of a base material layer/an adhesive agent layer/a barrier layer was produced. Next, onto the barrier layer of the laminate, an adhesive layer (thickness: 15 μm, disposed on the barrier layer side) made of a maleic anhydride-modified polypropylene resin and a heat-sealable resin layer (thickness: 15 μm, the innermost layer) made of a random polypropylene resin were co-extruded, and thus a laminated film in which a base material layer, an adhesive agent layer, a barrier layer, an adhesive layer, and a heat-sealable resin layer were laminated in this order was obtained. Next, the laminated film was subjected to an aging step to obtain a battery packaging material of Reference Example 1. In Reference Example 1, the aging step was performed at 40° C. for 48 hours.

In the production process of the battery packaging material of Reference Example 1, the temperature T (° C.) and the time S (minutes) at which the polybutylene terephthalate film was exposed to 100° C. or more were 0.

<Measurement of Piercing Strength>

The piercing strength of each of the battery packaging materials obtained above was measured by a method in accordance with the provision of JIS Z1707:1997. The piercing was performed from the base material layer side. In addition, ZP-50N (force gauge) and MX2-500N (test stand) produced by IMADA Co., Ltd. were used as a device for measuring piercing strength. The results are shown in Table 1.

<Measurement of Heat Shrinkage Ratio>

The heat shrinkage ratios of the films to constitute individual base material layers are values measured by the following method. First, as shown in the schematic view of FIG. 4, a film to constitute each base material layer with a 120 mm×120 mm square shape in plan view was used as a specimen 10A. On a surface of the specimen 10A, two ca. 100 mm-long straight lines M were drawn with a pen so as to be orthogonal to each other. At this time, the intersection of the two lines was positioned at the center of the film. Also, the two straight lines were drawn as being parallel to the edges of the specimen. Next, the precise lengths of the two lines were measured using a glass scale (the values measured at this time are expressed by A). Next, the specimen 10A was put in an oven at 150° C. (in the air), left at rest for 30 minutes, and then taken out to a room temperature environment (25° C.). Next, the precise lengths of the two lines were measured using a glass scale (the values measured at this time are expressed by B). Heat shrinkage ratios in the two directions were calculated by the calculation formula: (A−B)/A×100. The results are shown in Table 1.

<Evaluation of Moldability>

Each of the battery packaging materials obtained as described above was cut into a rectangle with 90 mm (MD)×150 mm (TD) to produce a sample. Using a molding die (a female mold) having a diameter of 32 mm (MD)×54 mm (TD) and a corresponding molding die (a male mold), the sample was cold-molded while changing the molding depth in 0.5 mm increments from a molding depth of 0.5 mm, under a pressing force of 0.9 MPa. The cold molding was performed for 20 samples at each depth. As regards the samples cold-molded, a value calculated by the following equation was defined as the molding depth of the battery packaging material, with A mm representing the deepest molding depth at which none of the 20 samples generated either pinholes or cracks on the aluminum foils, and B sample(s) representing the number of samples that generated pinholes or the like at the shallowest molding depth at which the aluminum foil generated pinholes or the like. The results are shown in Table 1.

Molding depth=$A$ mm+(0.5 mm/20 pieces)×(20 pieces−$B$ pieces)

In addition, as to machine direction (MD) and transverse direction (TD) of a battery packaging material, the rolling direction of aluminum foil is MD, and the direction perpendicular to MD in the same plane is TD. The rolling direction of aluminum foil can be confirmed by the rolling marks of the aluminum foil, and the MD and the TD of the battery packaging material can be confirmed from the rolling direction.

<Evaluation of Warp>

Figure 5:
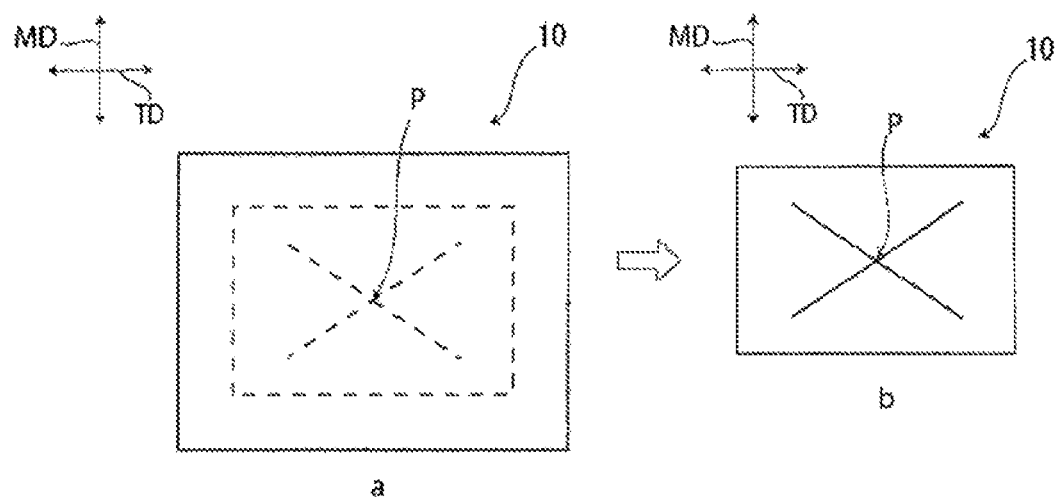
FIG. 5 is a schematic diagram for explaining a method for measuring the magnitude of the warp of a battery packaging material.
Figure 5:
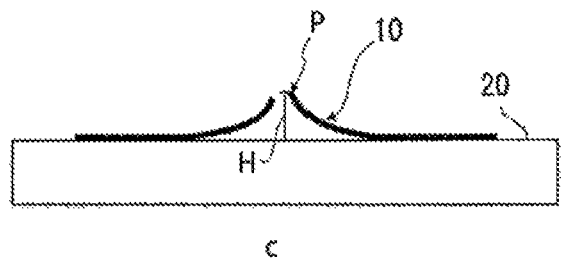

Each of the battery packaging materials obtained as described above was cut into a rectangle with 90 mm (MD)×150 mm (TD) to produce a sample. The battery packaging material is cut at the broken line in FIG. 5a to form a sample. The cutter blade corresponds to the rectangle of the sample, and the blade is provided such that two cuts 100 mm in length diagonally pass through the center P of the sample. By cutting once from the heat-sealable resin layer side of the battery packaging material using a cutter, a sample provided with cuts as shown in FIG. 5b is prepared. The cuts penetrate in the thickness direction of the sample. The sample was then stored for 24 hours in a dry room. Next, the sample taken out of the dry room is placed on a horizontal surface with the base material layer facing up, and when only the peripheral portion (about 10 mm in width) of the sample is pressed against the horizontal plane, the cuts are warped and the central portion P becomes higher than the horizontal surface. The shortest distance H between the horizontal plane and the central portion P (the height of warp) at this time is measured with a ruler (FIG. 5c). In addition, among the center portions P divided into four parts, the maximum value of the height H of warp is shown in Table 1.

<Evaluation of Chemical Resistance>

A specimen of 40 mm×40 mm in size was cut off from the battery packaging material obtained above. Next, one drop of an electrolytic solution (composed of 1 M $LiPF_6$ and a mixed solution of ethylene carbonate, diethyl carbonate and dimethyl carbonate (volume ratio=1:1:1)) was dropped on the surface of the base material layer, and after leaving this at rest under an environment having a temperature is 24° C. and a relative humidity 50% for 4 hours, the electrolytic solution was wiped off with a cloth containing isopropyl alcohol and the change of the surface was observed. At this time, the case where the surface did not change was judged as A, and the case where the surface discolored was judged as C. The results are shown in Table 1.

TABLE 1

| | Composition of resin composition forming cured resin layer (Thickness) | Piercing strength of laminate X (N) | Base material layer Thickness Y (μm) | Base material layer Type | X/Y (N/μm) | Total thickness of laminate (μm) | Molding depth (mm) | Height of warp H (mm) | Product of temperature T (° C.) and time S (minutes) | Chemical resistance | Heat shrinkage ratio of base material layer (%) MD | Heat shrinkage ratio of base material layer (%) TD |
|---|---|---|---|---|---|---|---|---|---|---|---|---|
| Example 1 | Acid-modified PP + epoxy compound (2 μm) | 17.8 | 15 | PBT | 1.19 | 85 | 7.4 | 6.5 | 40 | A | 6.1 | 4.6 |
| Example 2 | Acid-modified PP + isocyanate compound (3 μm) | 17.2 | 15 | PBT | 1.15 | 86 | 7.3 | 7.4 | 40 | A | 9.5 | 11.2 |
| Example 3 | Acid-modified PP + epoxy compound (2 μm) | 26.1 | 25 | PBT | 1.04 | 95 | 7.9 | 15.7 | 40 | A | 6.2 | 5.3 |
| Comparative Example 1 | Acid-modified PP (20 μm) | 18.6 | 15 | PBT | 1.24 | 108 | 6.8 | 20 | 380 | A | 6.1 | 4.6 |
| Comparative Example 2 | Acid-modified PP (20 μm) | 25.9 | 25 | PBT | 1.04 | 118 | 7.4 | 24.3 | 380 | A | 6.2 | 5.3 |
| Comparative Example 3 | Acid-modified PP + epoxy compound (2 μm) | 20.3 | 15 | ONy | 1.35 | 85 | 7.9 | 5.5 | 40 | C | 1.9 | 1.5 |
| Comparative Example 4 | Acid-modified PP + epoxy compound (2 μm) | 13.1 | 12 | PET | 1.09 | 82 | 3.8 | 6.0 | 40 | A | 1.4 | 0.2 |
| Reference Example 1 | Acid-modified PP (15 μm) | 14.8 | 15 | PBT | 0.99 | 98 | 4.8 | 7.8 | 40 | A | 3.2 | 2.4 |

*1: In Comparative Examples 1 and 2 in Table 1, an adhesive layer formed of maleic anhydride-modified polypropylene was provided instead of a cured resin layer.

In addition, in Table 1, acid-modified PP means maleic anhydride-modified polypropylene.

Since the battery packaging materials produced in the examples and the comparative examples had a value (X/Y) determined by dividing a piercing strength X (N) in the case of piercing the laminate from its base material layer side by a thickness Y (μm) of the polybutylene terephthalate film of 1.02 N/μm or more as shown in Table 1, they were superior in moldability. Furthermore, in the battery packaging materials of Examples 1 to 3, in which a cured resin layer was provided between a barrier layer and a heat-sealable resin layer, warp was effectively suppressed. On the other hand, in Comparative Examples 1 and 2, in which an adhesive layer formed of maleic anhydride-modified polypropylene was provided instead of a cured resin layer, the warp was large. In Comparative Example 3, in which a nylon film was used as a base material layer, the chemical resistance was poor. In Comparative Example 4, in which a polyethylene terephthalate film was used as a base material layer, the moldability was poor. In addition, in Reference Example 1, in which the above-mentioned ratio (X/Y) was less than 1.02 N/μm, although the warp was small, the moldability was poor as compared with the examples and the comparative examples.

DESCRIPTION OF REFERENCE SIGNS

1: Base material layer
5: Adhesive agent layer
2: Barrier layer
3: Cured resin layer
4: Heat-sealable resin layer
6: Surface coating layer
10: Battery packaging material
P: Center portion of sample
H: Shortest distance between horizontal plane and center portion P

The invention claimed is:

1. A battery packaging material constituted of a laminate including a base material layer, a barrier layer, a cured resin layer, and a heat-sealable resin layer in this order, wherein:
the cured resin layer is formed of a cured product of a resin composition containing an acid-modified polyolefin and a curing agent,
the base material layer is formed of a single layer of a polybutylene terephthalate film, or a laminate of two layers of a polybutylene terephthalate film and other film, in either order, the other film being constituted of at least one material selected from the group consisting of a polyester, a polyamide, an epoxy resin, an acrylic resin, a fluororesin, a polyurethane, a silicone resin, a phenol resin, a polycarbonate resin, a polyetherimide, and a polyimide, and
when the base material layer is the laminate of two layers, the laminate of the two layers optionally comprises an adhesive agent layer between the two layers, and
a value determined by dividing a piercing strength X (N) in the case of piercing the laminate from the base material layer side measured by a method in accordance with a provision of JIS Z1707:1997 by a thickness Y (μm) of the polybutylene terephthalate film is 1.02 N/μm or more.

2. The battery packaging material according to claim 1, wherein a resin constituting the cured resin layer has a polyolefin skeleton.

3. The battery packaging material according to claim 1, wherein when the cured resin layer is analyzed by infrared spectroscopy, a peak derived from maleic anhydride is detected.

4. The battery packaging material according to claim 1, wherein the curing agent is at least one species selected from the group consisting of a compound having an isocyanate group, a compound having an oxazoline group, and a compound having an epoxy group.

5. The battery packaging material according to claim 1, wherein the curing agent has at least one member selected from the group consisting of an oxygen atom, a heterocyclic ring, a C=N bond, and a C—O—C bond.

6. The battery packaging material according to claim 1, wherein a total thickness of the cured resin layer and the heat-sealable resin layer is 90 μm or less.

7. The battery packaging material according to claim 1, wherein the thickness Y of the polybutylene terephthalate film is 10 μm or more and 40 μm or less.

8. The battery packaging material according to claim 1, wherein a thickness of the cured resin layer is 0.5 μm or more and 40 μm or less.

9. A method for producing the battery packaging material according to claim 1, the method comprising:
obtaining the laminate by laminating at least the base material layer, the barrier layer, the cured resin layer and the heat-sealable resin layer in this order.

10. A battery, comprising:
the battery packaging material according to claim 1, and
a battery element comprising a positive electrode, a negative electrode, and an electrolyte,
wherein the battery element is contained in a packaging formed of the battery packaging material.

11. The battery packaging material according to claim 1, wherein:
the thickness of the laminate is 35 μm or more and 250 μm or less,
the thickness of the cured resin layer is 0.5 μm or more and 40 μm or less, and
the thickness Y (μm) of the polybutylene terephthalate film is 10 μm or more and 40 μm or less.

12. The battery packaging material according to claim 1, wherein:
the thickness of the laminate is 81 μm or more and 120 μm or less,
the thickness of the cured resin layer is 2 μm or more and 20 μm or less, and
the thickness Y (μm) of the polybutylene terephthalate film is 15 μm or more and 25 μm or less.

13. The battery packaging material according to claim 1, wherein the acid-modified polyolefin is a polyolefin modified with an unsaturated carboxylic acid or its acid anhydride.

14. The battery packaging material according to claim 13, wherein the acid-modified polyolefin is an acid-modified polyethylene or an acid-modified polyolefin polypropylene.

15. The battery packaging material according to claim 1, further comprising a lubricant on a surface of the base material layer in an amount of 3 mg/m² or more.

16. The battery packaging material according to claim 1, further comprising a lubricant on a surface of the heat-sealable resin layer in an amount of 10 mg/m² or more and 50 mg/m² or less.

17. The battery packaging material according to claim 1, further comprising two or more lubricants on a surface of the base material layer and/or in the base material layer.

18. The battery packaging material according to claim 1, wherein the heat-sealable resin layer is constituted of a resin containing a polyolefin skeleton.

19. The battery packaging material according to claim 1, wherein the heat-sealable resin layer is formed of a blended polymer obtained by combining two or more resins.

20. The battery packaging material according to claim 1, wherein the heat-sealable resin layer comprises at least one selected from the group consisting of a polyolefin, a cyclic polyolefin, an acid-modified polyolefin, and an acid-modified cyclic polyolefin.

21. The battery packaging material according to claim 1, further comprising two or more lubricants on a surface of the heat-sealable resin layer and/or in the heat-sealable resin layer.

22. The battery packaging material according to claim 1, wherein a thickness of the laminate is 200 μm or less.

23. The battery packaging material according to claim 1, wherein a thickness of the laminate is 160 μm or less.

24. The battery packaging material according to claim 1, wherein a thickness of the laminate is more than 160 μm and 200 μm or less.

25. A polybutylene terephthalate film for a battery packaging material is a polybutylene terephthalate film to be used for a battery packaging material constituted of a laminate including at least a base material layer, a barrier layer, a cured resin layer, and a heat-sealable resin layer in this layer as the base material layer, wherein
    in the battery packaging material, a value determined by dividing a piercing strength X (N) in the case of piercing the laminate from its base material layer side measured by a method in accordance with a provision of JIS Z1707:1997 by a thickness Y (μm) of the polybutylene terephthalate film is 1.02 N/μm or more.

26. A method for producing a battery packaging material, the method comprising: obtaining a laminate by laminating at least a base material layer, a barrier layer, a cured resin layer and a heat-sealable resin layer in this order, wherein
    at least one layer of the base material layer is formed of the polybutylene terephthalate film according to claim 25,
    a sum total of a product of a temperature T (° C.) and a time S (minutes) when the polybutylene terephthalate film is exposed to 100° C. or more is set to 160 or less.

* * * * *